(12) United States Patent
Takano et al.

(10) Patent No.: US 8,066,195 B2
(45) Date of Patent: *Nov. 29, 2011

(54) OBJECT, IMAGE DATA, IMAGE DATA TRANSMISSION METHOD, CARD, GAME MAT, CARD GAME SYSTEM, IMAGE ANALYSIS APPARATUS, AND IMAGE ANALYSIS METHOD

(75) Inventors: Masanori Takano, Tokyo (JP); Hirofumi Okamoto, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/534,979

(22) Filed: Aug. 4, 2009

(65) Prior Publication Data

US 2009/0321521 A1 Dec. 31, 2009

Related U.S. Application Data

(62) Division of application No. 10/590,759, filed as application No. PCT/JP2005/018926 on Oct. 14, 2005, now Pat. No. 7,661,601.

(30) Foreign Application Priority Data

Oct. 15, 2004 (JP) .................................. 2004-301310
Sep. 15, 2005 (JP) .................................. 2005-269295

(51) Int. Cl.
*G06K 19/06* (2006.01)
(52) U.S. Cl. ..................... 235/494; 235/454; 235/426.08
(58) Field of Classification Search .................. 235/494, 235/454, 487, 462.1, 462.09, 462.08
See application file for complete search history.

(56) References Cited

U.S. PATENT DOCUMENTS

| | | | |
|---|---|---|---|
| 5,726,435 | A | 3/1998 | Hara et al. |
| 5,825,015 | A | 10/1998 | Chan |
| 6,116,510 | A | 9/2000 | Nishino |
| 6,267,296 | B1 | 7/2001 | Ooshima et al. |
| 6,631,905 | B1 | 10/2003 | Slade |
| 6,681,055 | B1 | 1/2004 | Sato |
| 7,032,823 | B2 | 4/2006 | Nojiri |
| 2004/0002387 | A1 | 1/2004 | Grady |
| 2006/0079324 | A1* | 4/2006 | Watanabe et al. ............... 463/30 |

FOREIGN PATENT DOCUMENTS

EP 0 672 994 9/1995

(Continued)

OTHER PUBLICATIONS

International Preliminary Report of Patentability with translation, dated Apr. 17, 2007 for corresponding International No. PCT/JP2005/018926.

(Continued)

*Primary Examiner* — Edwyn Labaze
(74) *Attorney, Agent, or Firm* — Katten Muchin Rosenman LLP

(57) ABSTRACT

There is provided a two-dimensional code capable of performing accurate recognition. The two-dimensional code includes: a code data portion (102) where a plurality of square cells (106) are two-dimensionally arranged to constitute code data; and a plurality of corner cells (104) arranged so as to surround the code data portion (102). The corner cells (104) are configured with a greater area than the square cells (106). When the two-dimensional code is imaged by an imaging device, the corner cells (104) can be recognized in a large scale, thereby improving the two-dimensional code read accuracy.

19 Claims, 16 Drawing Sheets

FOREIGN PATENT DOCUMENTS

| | | |
|---|---|---|
| JP | 03-038791 | 2/1991 |
| JP | 07-254037 | 10/1995 |
| JP | 08-329172 | 12/1996 |
| JP | 10-503304 | 3/1998 |
| JP | 10-208001 | 8/1998 |
| JP | 11-353436 | 12/1999 |
| JP | 11-186276 | 3/2000 |
| JP | 2001-138583 | 5/2001 |
| JP | 2003-256876 | 9/2003 |
| JP | 2004-145475 | 5/2004 |

OTHER PUBLICATIONS

Written Opinion of the International Searching Authority with translation, for corresponding International Application No. PCT/JP2005/018926.

International Search Report with translation, dated Jan. 24, 2006 for corresponding International Application No. PCT/JP2005/08926.

Notice of Preliminary Rejection, dated Oct. 30, 2007, for the corresponding Korean Patent Application No. 10-2006-7018844.

Non-final Office Action dated Feb. 22, 2008, for corresponding U.S. Appl. No. 10/590,759.

Notification of Reason(s) for Refusal dated Jan. 22, 2008 for corresponding Japanese Patent Application No. 2004-301309.

Korean Office Action dated May 30, 2008, for the corresponding Korean Application.

Non-final Office Action dated Sep. 10, 2008, for corresponding U.S. Appl. No. 10/590,759.

Notification of Reason(s) for Refusal, dated Sep. 9, 2008, for corresponding Japanese Patent Application JP 2004-301309.

Non-final Office Action dated Dec. 19, 2008, for corresponding U.S. Appl. No. 10/590,759.

Notification of Reason(s) for Refusal, dated Jun. 2, 2009 for corresponding Japanese Patent Application No. 2005-269295.

Supplementary European Search Report dated Aug. 19, 2009 from corresponding European Application EP 05 79 3212.

\* cited by examiner

4

4

300

310

OBJECT, IMAGE DATA, IMAGE DATA TRANSMISSION METHOD, CARD, GAME MAT, CARD GAME SYSTEM, IMAGE ANALYSIS APPARATUS, AND IMAGE ANALYSIS METHOD

TECHNICAL FIELD

The present invention relates to a technology for representing code data by arranging cells in a two-dimensional array.

BACKGROUND TECHNOLOGY

Recently, the technology is widely available for capturing an image of a two-dimensional code by a camera for recognition and allowing a predetermined process associated with the code data to be performed. Compared to one-dimensional codes, two-dimensional codes can store a larger amount of coded information. Various kinds of two-dimensional codes are available these days. The data for a two-dimensional code needs to be read from image data efficiently and properly. In this background, technologies related to image recognition of two-dimensional codes have been proposed (e.g. patent document 1).
patent document 1
   JP 2000-82108

DISCLOSURE OF THE INVENTION

If the resolution of image data is high, a large amount of information for two-dimensional codes can be acquired so that a high recognition rate of code data is achieved. It is favorable to attain a high rate of recognition of code data even with a camera with relatively low resolution. Image data captured contains influence from, for example, ambient light outside a camera. In this regard, it is favorable to properly configure a range of pixel values for binarization of the image data captured, by allowing for the influence.

A general purpose of the present invention in this background is to provide a technology capable of recognizing a two-dimensional code or an article such as a card with high precision.

An article according to at least one embodiment of the present invention comprises: a code data field including a two-dimensional array of a plurality of rectangular cells to form code data; and a plurality of corner cells provided to surround the code data field, wherein at least one of the corner cells occupies a larger area than at least one of the rectangular cells. The article may be a two-dimensional object such as a card or a three-dimensional object. The rectangular cells and the corner cells may be printed on the article or engraved on the article. An essential requirement is that the cells are provided such that images thereof can be captured by the imaging apparatus.

An article according to at least one embodiment of the present invention comprises: a code data field including a two-dimensional array of a plurality of rectangular cells to form code data; and a plurality of corner cells provided to surround the code data field, wherein the corner cells are round in shape. The article may be a two-dimensional object such as a card or a three-dimensional object. The rectangular cells and the corner cells may be printed on the article or engraved on the article. An essential requirement is that the cells are provided such that images thereof can be captured by the imaging apparatus.

There is also provided image data generated in accordance with a data format for displaying a two-dimensional code on a display, wherein the image data comprises: data for displaying a plurality of rectangular cells at predetermined coordinate positions on the display; and data for displaying a plurality of corner cells at coordinate positions surrounding the plurality of rectangular cells, wherein the data for the corner cells and the rectangular cells is configured such that at least one of the corner cells appears larger than at least one of the rectangular cells when displayed.

There is also provided image data generated in accordance with a data format for displaying a two-dimensional code on a display, wherein the image data comprises: data for displaying a plurality of rectangular cells at predetermined coordinate positions on the display; and data for displaying a plurality of corner cells at coordinate positions surrounding the plurality of rectangular cells which are displayed at the predetermined coordinate positions, wherein the data for the corner cells is configured such that the corner cells appear round when displayed.

In a method according to at least one embodiment of the present invention for transmitting image data generated in accordance with a data format for displaying a two-dimensional code on a display, the image data comprises: data for displaying a plurality of rectangular cells at predetermined coordinate positions on the display, data for displaying a plurality of corner cells at coordinate positions surrounding the plurality of rectangular cells which are displayed at the predetermined coordinate positions, and the data for the corner cells and the rectangular cells is configured such that at least one of the corner cells appears larger than at least one of the rectangular cells when displayed.

In a method according to at least one embodiment of the present invention for transmitting image data generated in accordance with a data format for displaying a two-dimensional code on a display, the image data transmitted comprises: data for displaying a plurality of rectangular cells at predetermined coordinate positions on the display; data for displaying a plurality of corner cells at coordinate positions surrounding the plurality of rectangular cells, wherein the data for the corner cells is configured such that at least one of the corner cells appears round when displayed. An article according to at least one embodiment of the present invention comprises: a reference cell having a predetermined shape; and a plurality of polygonal cells in a two-dimensional array to form code data; and a plurality of corner cells provided to surround an area with the two-dimensional array of the plurality of polygonal cells, wherein at least one of the reference cell, the polygonal cells and the corner cells is assigned a color different from that of the other cells. The article may be a two-dimensional object such as a card or a three-dimensional object. The rectangular cells and the corner cells may be printed on the article or engraved on the article. An essential requirement is that the cells are provided such that images thereof can be captured by the imaging apparatus.

There is also provided image data generated in accordance with a data format for displaying a two-dimensional code on a display, wherein the image data transmitted comprises: data for displaying a reference cell having a predetermined shape at a predetermined position on the display; data for displaying a plurality of polygonal cells within an area defined with respect to the reference cell; and data for displaying a plurality of corner cells at coordinate positions surrounding the area, wherein at least one of the reference cell, the polygonal cells and the corner cells is assigned a color different from that of the other cells.

In a method according to at least one embodiment of the present invention for transmitting image data generated in accordance with a data format for displaying a two-dimensional code on a display, the image data transmitted comprises: data for displaying a reference cell having a predetermined shape at a predetermined position on the display, data for displaying a plurality of polygonal cells within an area defined with respect to the reference cell; and data for displaying a plurality of corner cells at coordinate positions surrounding the area, wherein at least one of the reference cell, the polygonal cells and the corner cells is assigned a color different from that of the other cells.

An image analysis apparatus for recognizing an object image included in a frame image is also provided. The object image includes a reference cell having a predetermined shape and a plurality of corner cells assigned a color different from that of the reference cell. The image analysis apparatus comprises: a binarization processor which sets up a range of pixel values in the RGB format so as to translate the frame image into a binary bit representation; a first detector which detects the reference cell in binary data for the frame image; and a second detector which detects the corner cells in the binary data for the frame image. The binarization processor sets up a range of pixel values in the RGB format for detecting the reference cell and binarizes the frame image by extracting pixels within the range thus set up, whereupon the first detector detects the reference cell by referring to the resultant binary data. The binarization processor sets up a range of pixel values in the RGB format for detecting the corner cells and binarizes the frame data by extracting pixels within the range thus set up, whereupon the second detector detects the corner cells by referring to the resultant binary data.

A method for recognizing an object image included in a frame image is also provided. The object image includes a reference cell having a predetermined shape and a plurality of corner cells assigned a color different from that of the reference cell. The method comprises: setting up a range of pixel values in the RGB format for detecting the reference cell, extracting pixels within the range thus set up, and detecting the reference cell in the frame image; and setting up a range of pixel values in the RGB format for detecting the corner cells, extracting pixels within the range thus set up, and detecting the corner cells in the frame image.

An article according to at least one embodiment of the present invention comprises: a reference cell having a predetermined shape; and a plurality of polygonal cells in a two-dimensional array to form code data; and a plurality of corner cells having an identical shape. The corner cells are assigned a color different from that of the reference cell and the polygonal cells. The article may be a two-dimensional object such as a card or a three-dimensional object.

A game mat is also provided on which a game card is placed and which is provided with a gradation area in which brightness varies gradually.

A card game system according to at least one embodiment of the present invention comprises: a game card having a cell assigned a predetermined color; a game mat assigned a color of the same hue as the cell of the game card and provided with a gradation area in which brightness varies gradually; an imager which acquires a frame image by capturing an image of the game mat and an image of the game card placed on the game mat; a binarization processor which sets up a range of pixel values in the RGB format and translates the frame image into a binary bit representation; an extractor which extracts the gradation area on the game mat, from binary data for the frame image; and an adjuster which refers to binary data for the gradation area and accordingly adjusts the range of pixel values in the RGB format for binarization by the binarization processor.

An image analysis apparatus according to at least one embodiment of the present invention for analyzing a frame image capturing an image of a game card having a cell assigned a predetermined color and an image of a game mat which is assigned a color of the same hue as the cell and which is provided with a gradation area in which brightness varies gradually, comprises: a binarization processor which sets up a range of pixel values in the RGB format so as to translate the frame image into a binary bit representation; an extractor which extracts the gradation area on the game mat, from binary data for the frame image; and an adjuster which refers to binary data for the gradation area and accordingly adjusts the range of pixel values in the RGB format for binarization by the binarization processor.

An image analysis method according to at least one embodiment of the present invention for analyzing a frame image capturing an image of a game card having a cell assigned a predetermined color and an image of a game mat which is assigned a color of the same hue as the cell of the game card and which is provided with a gradation area in which brightness varies gradually, comprises: setting up a range of pixel values in the RGB format so as to translate the frame image into a binary bit representation; extracting the gradation area on the game mat, from binary data for the frame image; and referring to binary data for the gradation area and accordingly adjusts the range of pixel values in the RGB format for binarization.

A program product according to at least one embodiment of the present invention comprising computer readable codes for causing a computer to analyze a frame image that captures an image of a game card having a cell assigned a predetermined color and an image of a game mat which is assigned a color of the same hue as the cell and which is provided with a gradation area in which brightness varies gradually, comprises: a translating module which sets up a range of pixel values in the RGB format so as to translate the frame image into a binary bit representation; an extracting module which extracts the gradation area on the game mat, from binary data for the frame image; and an adjusting module which refers to binary data for the gradation area and accordingly adjusts the range of pixel values in the RGB format for binarization.

Optional combinations of the aforementioned constituting elements, and implementations of the invention in the form of methods, apparatuses, systems, recording mediums and computer programs may also be practiced as additional modes of the present invention.

According to the present invention, a two-dimensional code that can be recognized with high precision is provided.

1 ... game system, 2 ... imaging apparatus, 4 ... game card, 6 ... output apparatus, 7 ... display, 10 ... image processing apparatus, 20 ... image analysis apparatus, 30 ... game apparatus, 40 ... frame image acquirer, 42 ... real object extractor, 44 state determiner, 50 ... binarization processor, 52 ... reference cell detector, 54 ... code field detector, 56 ... verification processor, 60 ... area extractor, 62 ... RGB adjuster, 100 ... reference cell, 102 ... code data field, 104 corner cell, 106 rectangular cell, 108 ... area, 110 ... code field, 200 ... image transmission system, 201 ... image data generation apparatus, 202 ... terminal, 203 display apparatus, 204 ... transmission station

BEST MODE FOR CARRYING OUT THE INVENTION

Figure 1:
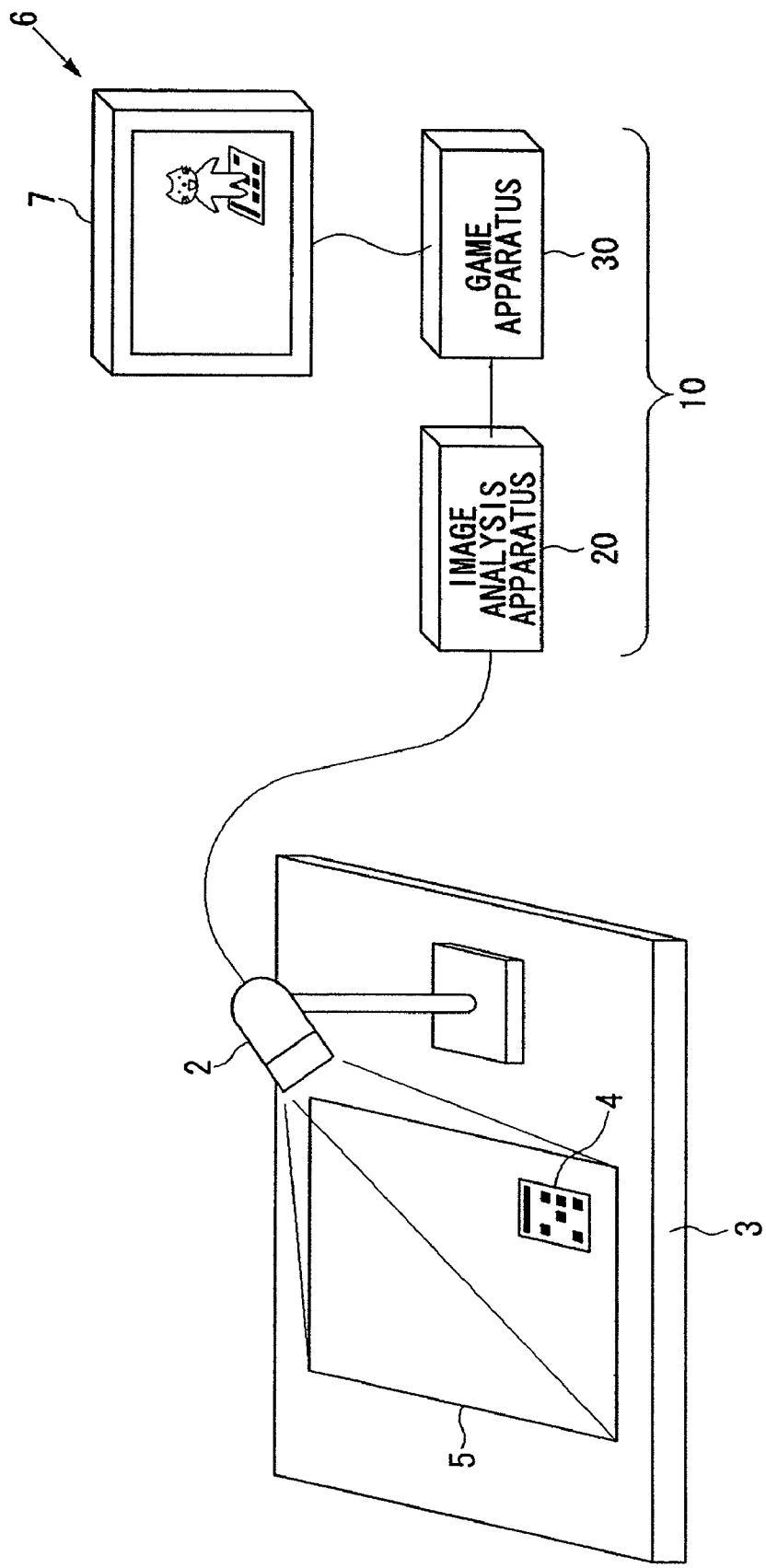
FIG. 1 shows the structure of a game system according one example of the invention.

FIG. 1 shows the structure of a game system 1 according to an example of the present invention. The game system 1 is provided with an imaging apparatus 2, an image processing apparatus 10 and an output apparatus 6. The image processing apparatus 10 is provided with an image analysis apparatus 20 and a game apparatus 30. The image analysis apparatus 20 and the game apparatus 30 may be separate apparatuses or may be integrally combined. The imaging apparatus 2 is embodied by a video camera comprising a charge coupled device (CCD) imaging element, a metal oxide semiconductor (MOS) imaging element or the like. For example, the imaging apparatus 2 has a resolution of 320 by 240 pixels. The imaging apparatus 2 captures an image of a real space periodically so as to generate a frame image in each period. An imaging area 5 represents a range captured by the imaging apparatus 2. The position and size of the imaging area 5 are adjusted by adjusting the height and orientation of the imaging apparatus 2. A game player manipulates a game card 4, a real object, in the imaging area 5. The game card 4 is provided with a two-dimensional code that uniquely identifies the card.

The output apparatus 6 is provided with a display 7. The output apparatus 6 may also be provided with a speaker (not shown). The image processing apparatus 10 causes the display 7 to display a frame image captured by the imaging apparatus 2. In this process, the image processing apparatus 10 controls a character, a virtual object, to be superimposed on the game card 4 when displayed. The player can easily recognize whether the game card 4 is located within the imaging area 5 by watching the display 7. If the game card 4 is not located within the imaging area 5, the player may allow the imaging apparatus 2 to capture the image of the game card 4 by shifting the position of the game card 4 or by adjusting the orientation of the imaging apparatus 2.

In the game application according to this example, the player moves a character by manipulating the game card 4. As called for by the nature of the game application, it is favorable that the player feels the sense of unity between the game card 4 and the character. For this purpose, the image of the character is superimposed on the game card 4. As the player moves the game card 4 slowly in the imaging area 5, the character tracks the movement of the game card 4, remaining placed on the game card 4.

The character motion as described above is controlled by the image processing apparatus 10. First, the image analysis apparatus 20 extracts image information for the game card 4 from the frame image captured by the imaging apparatus 2. The image analysis apparatus 20 further extracts the two-dimensional code printed on the game card 4 from the image information for the game card 4. In this process, the image analysis apparatus 20 determines position information, orientation information and distance information for the game card 4 in a space, by referring to the two-dimensional code on the game card 4.

The image processing apparatus 20 determines the distance between the imaging apparatus 2 and the game card 4, the orientation of the game card 4 by using a reference cell and corner cells in the image of the game card 4 included in the frame image. The character is controlled so that it faces forward when displayed on the game card 4. The image analysis apparatus 20 also acquires code data embodied on the game card 4 by referring to an array of the multiple rectangular cells in a two-dimensional code.

While FIG. 1 shows a state in which the game card 4 is placed on a table 3, the game card 4 may be at an angle with respect to the table 3. Alternatively, the game card 4 may be elevated from the table 3. The image analysis apparatus 20 has the function of recognizing the angled position of the game card 4 or variation in the height of the game card 4 with respect to the table 3, through image analysis. The result of image analysis by the image analysis apparatus 20 is sent to the game apparatus 30. The frame image captured by the imaging apparatus 2 may be sent to the game apparatus 30 for image analysis by the game apparatus 30. In this case, the image processing apparatus 10 may be formed only of the game apparatus 30.

The game apparatus 30 controls the character to be displayed on the game card 4, by referring to the result of image analysis by the image analysis apparatus 20. The character may be associated with the code data extracted from the game card 4 and assigned to each game scene. In this case, when a game scene changes, the character displayed is also changed.

Figure 2:
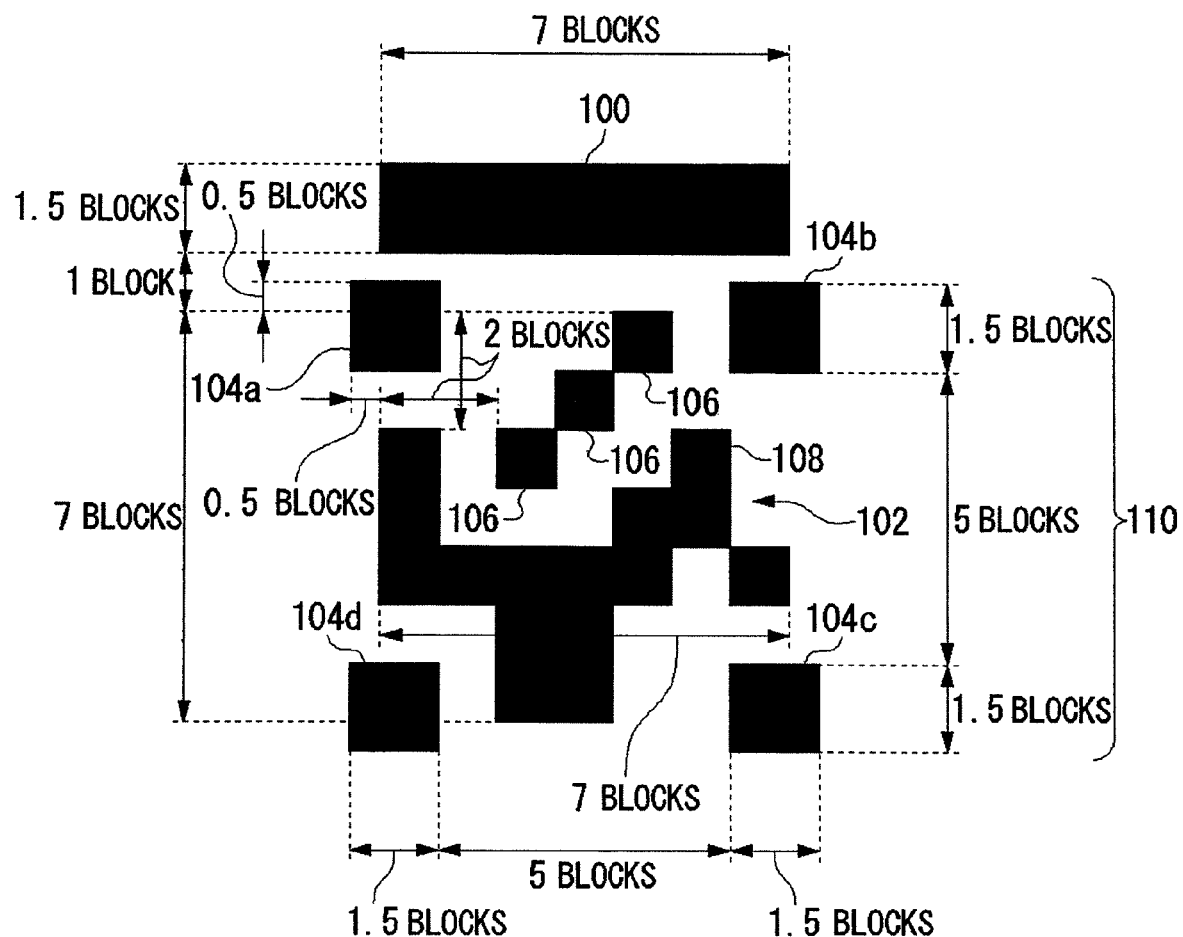
FIG. 2 shows a two-dimensional code printed on the surface of a game card.

FIG. 2 shows a two-dimensional code printed on the surface of the game card 4. Multiple polygonal cells having predetermined shapes are arranged two-dimensionally according to a predetermined rule of arrangement. More specifically, the two-dimensional code embodied on the game card 4 is provided with a reference cell 100 that serves as a reference in recognizing the game card 4 in the image data captured by the imaging apparatus 2, a code data field 102 constituting code data by containing a two-dimensional array of multiple rectangular cells 106, and multiple corner cells 104a, 104b, 104c and 104d (hereinafter, generically referred to as corner cells 104) provided to surround the code data field 102. The code data field 102 and the corner cells 104 are located in a code field 110 in the two-dimensional code.

The reference cell 100, the rectangular cell 106 and the corner cells 104 have predetermined shapes, respectively. In the two-dimensional code shown in FIG. 2, the cells are shown painted over with black. Referring to FIG. 2, an area 108 is formed by connecting multiple rectangular cells 106 and constitutes the code data in combination with the other rectangular cells 106. Each rectangular cell 106 has the identical shape (in this case, a square shape). If several types of the game cards 4 according to this example are available, the reference cell 100 and the corner cells 104 are identically located and sized in the different types. The game card 4 can be uniquely identified by referring to the arrangement of the rectangular cells 106 in the code data field 102.

A description will now be given of the details of the two-dimensional code according to this example. Letting one side of the rectangular cell 106 of a square shape represent one block, the reference cell 100 is formed as a rectangular cell (element) with the longer side spanning 7 blocks horizontally and the shorter side spanning 1.5 blocks vertically. A square area formed by a 1 by 1 block according to this example will be referred to as a block area.

The code data field 102 is formed within an area defined by a 7 by 7 block. One side of the area is parallel with the longer side of the reference cell 100 and is removed from the longer side of the reference cell 100 by 1 block. As shown, the code field 110 is an area defined by an 8 by 8 block. The code data field 102 is included in an area in which the code field 110 is formed. The rectangular cells 106 are actually provided outside the 2 by 2 blocks at the four corners of the area defined by the 7 by 7 block. More specifically, the rectangular cells 106 are not provided in the 2 by 2 blocks at the four corners. Therefore, the rectangular cells 106 are provided in 33 (=7× 7−2×2×4) block areas so as to form code data.

A corner cell 104a is provided in an area at the top left corner of the code area 110. The area at the top left corner may be within an area of 2 by 2 block at the top left corner of the area defined by the 7 by 7 block representing the code data field 102. Alternatively, the top left corner area may protrude from the area of 2 by 2 block. In the illustrated example, the corner cell 104a is provided so as to protrude from the area of 2 by 2 block at the top left corner in the code data field 102, by 0.5 blocks vertically and by 0.5 blocks horizontally. That is, the corner cell 104a is located within an area defined by a 2.5 by 2.5 block at the top left corner of the code field 110. Similarly, the corner cell 104b is provided in an area at the top right corner of the code field 110. The corner cell 104c is provided in an area at the bottom right corner of the code field 110. The corner cell 104d is provided in an area at the bottom left corner of the code field 110. In the illustrated example, the corner cells 104 are formed as rectangles. More specifically, they are formed as squares with each side being equal to 1.5 blocks in length.

Given that a block area represents 1 bit, the code data field 102 is capable of coding information comprising a total of 33 bits. Of the 33 bits, 9 bits represent check data for verifying whether the code data is proper. Therefore, information comprising 24 bits is coded in the code data field 102.

The rectangular cells 106 are important elements that represent code data and should be accurately recognized by the image analysis apparatus 20. For this purpose, it is ideal that all the rectangular cells 106 be formed to be large. Naturally, however, due to the size constraints of the game card 4, enlarging the rectangular cells 106 would result in reduction in the number of rectangular cells 106 in the code data field 102. This is not favorable since it is equivalent to reducing the number of information bits.

In this background, the corner cells 104 in this example are formed to occupy larger areas than the rectangular cells 106. In the image analysis apparatus 20 according to this example, the four corner cells 104 are used to detect the code data field 102, as described later. This translates to the fact that, if the four corner cells 104 fail to be detected, the rectangular cells 106 cannot be detected. Therefore, it is imperative in this two-dimensional code that the corner cells 104 be recognized properly prior to the recognition of the rectangular cells 106. By forming the four corner cells 104 to be larger than the rectangular cells 106, the rate of recognition of the four corner cells 104 is increased.

The image analysis apparatus 20 extracts candidates for the reference cell 100 in the frame image and assumes the one that meets a predetermined criteria as being the reference cell 100. The image analysis apparatus 20 then determines whether there are four corner cells 104 in the neighborhood of the cell assumed to be the reference cell 100. If the four corner cells 104 are recognized, the image analysis apparatus 20 reads the layout of rectangular cells 106 in an area surrounded by the four corner cells 104 (i.e. in the code data field 102). In this way, the image analysis apparatus 20 acquires code data. This confirms a determination that the cell assumed to be the reference cell 100 is really the reference cell 100. The game card 4 is recognized as such. The image analysis apparatus determines by calculation the position and orientation of the game card 4 in the virtual three-dimensional coordinate system, with reference to the imaging apparatus 2 as the origin.

Figure 3:
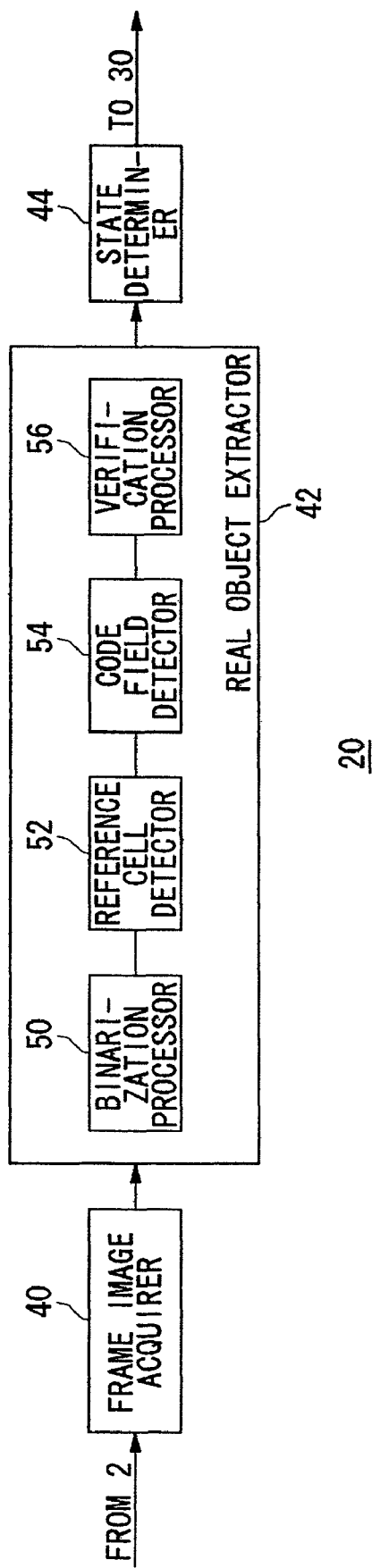
FIG. 3 shows the structure of an image analysis apparatus.

FIG. 3 shows the structure of the image analysis apparatus. The image analysis apparatus 20 is provided with a frame image acquirer 40, a real object extractor 42 and a state determiner 44. The real object extractor 42 is provided with a binarization processor 50, a reference cell detector 52, a code field detector 54 and a verification processor 56. Processing functions of the imaging apparatus 20 according to this example are implemented by a CPU, a memory, a program loaded into the memory, etc. FIG. 3 depicts function blocks implemented by the cooperation of the elements. The program may be built in the imaging apparatus 20 or supplied from an external source in the form of a recording medium. Therefore, it will be obvious to those skilled in the art that the functional blocks may be implemented by a variety of manners including hardware only, software only or a combination of both. In the illustrated example, the CPU of the image analysis apparatus 20 has the functions of the frame image acquirer 40, the real object extractor 42 and the state determiner 44.

The frame image acquirer 40 acquires a frame image of a real space captured by the imaging apparatus 2. The imaging apparatus 2 captures a frame image at regular intervals. Preferably, the imaging apparatus 2 generates frame images at intervals of 1/60 seconds.

The real object extractor 42 extracts a real object image, i.e., an image of the game card 4, from the frame image. More specifically, the binarization processor 50 translates the frame image into a binary representation so as to represent the information for the frame image in ons and offs. The reference cell detector 52 extracts the reference cell 100 by referring to the binary data for the frame image. When the reference cell 100 is detected, the code field detector 54 detects the code field 110 based upon the position of the reference cell 100. The verification processor 56 verifies the code data included in the code field 110.

The state determiner 44 determines the state of the real object in the coordinate system. More specifically, the state determiner 44 determines the distance of the game card 4 from the imaging apparatus 2 as well as the position and orientation of the game card 4. The position information, orientation information and distance information determined in the state determiner 44 are associated with the code data acquired from the two-dimensional code before being transmitted to the game apparatus 30. If multiple game cards 4 are located within the imaging area 5, the position information, orientation information, distance information and code data are associated with each of the game cards 4 before being transmitted to the game apparatus 30. Since the frame image captured by the imaging apparatus 2 is displayed on the display 7 of the game system 1, the frame image itself is transmitted to the game apparatus 30. The game apparatus 30 reads a character associated with the code data and superimposes the character on the game card 4 displayed in a three-dimensional virtual space.

Figure 4:
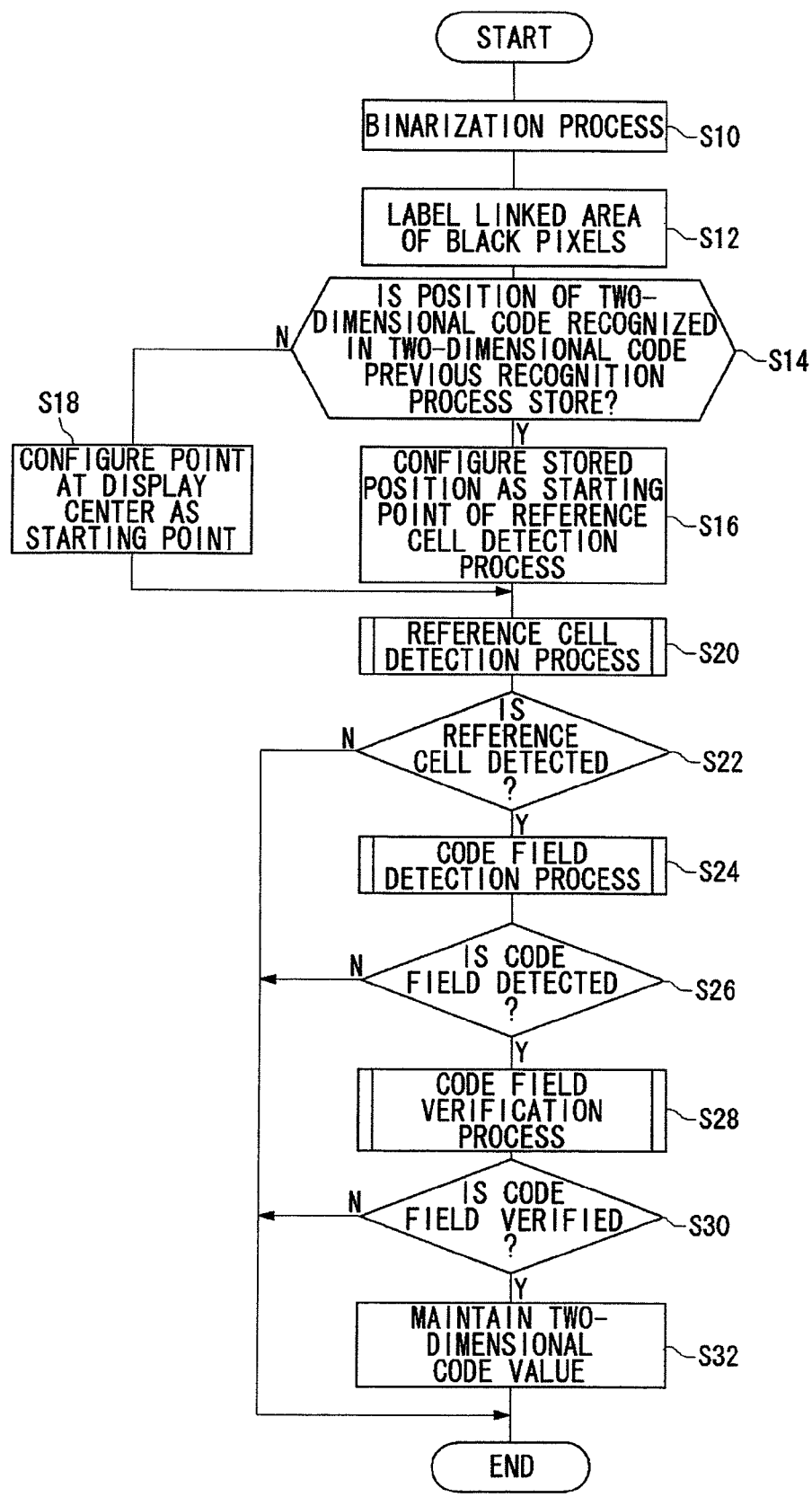
FIG. 4 shows a processing procedure for recognition of two-dimensional codes.

FIG. 4 is a flowchart showing a processing procedure for recognition of two-dimensional codes. An image of a two-dimensional code is captured by the imaging apparatus 2. Resultant image data for one frame is acquired by the frame image acquirer 40. The binarization processor 50 binarizes the image data (S10). In binarization, pixels having a luminance value higher than a predetermined threshold are coded into pixel values of "0" and represented in white when displayed. Hereinafter, pixels coded into pixel values of "0" will be referred to as white pixels. Pixels having a luminance value equal to or lower than the threshold are coded into pixel values of "1" and represented in black when displayed. Hereinafter, pixels coded into pixel values of "1" will be referred to as black pixels. The binarization processor 50 organizes a set of contiguous black pixels into a linked area. The binarization processor numerically numbers (labels) multiple linked areas of black pixels thus extracted in the ascending order, starting with 1 (S12). For example, the linked areas may be numbered in the order of extraction. The numbers are stored in a RAM (not shown) along with the coordinate data. Since the corner cells 104 are larger than the rectangular cells 106 when displayed, the use of the two-dimensional code shown in FIG. 2 will increase the likelihood of the corner cells 104 being detected as linked areas of black pixels and improve the accuracy of coordinate position.

The reference cell detector 52 determines whether the display position of the two-dimensional code recognized in the previous process for recognizing two-dimensional codes (e.g., the position of the center point of the reference cell 100), which is targeted at image data different from the one currently being processed, is stored in the RAM (S14). If the center point of the reference cell 100 in the previous frame is stored in the RAM (Y in S14), the position stored is configured as a starting point for the reference cell detecting process (S16). If the reference cell 100 was detected in the previous image frame, it is likely that the position of the game card 4 has changed little. Therefore, by using the center point of the reference cell 100 in the previous frame, the reference 100 in the current frame may be detected efficiently. If the position of the two-dimensional code is not stored in the RAM (N in S14), the reference cell detector 52 configures the point at the center of the display 7 as a starting point for the reference cell detection process (S18). Following the establishment of the starting point, the reference cell detector 52 performs the process of detecting the reference cell 100 (S20).

Figure 5:
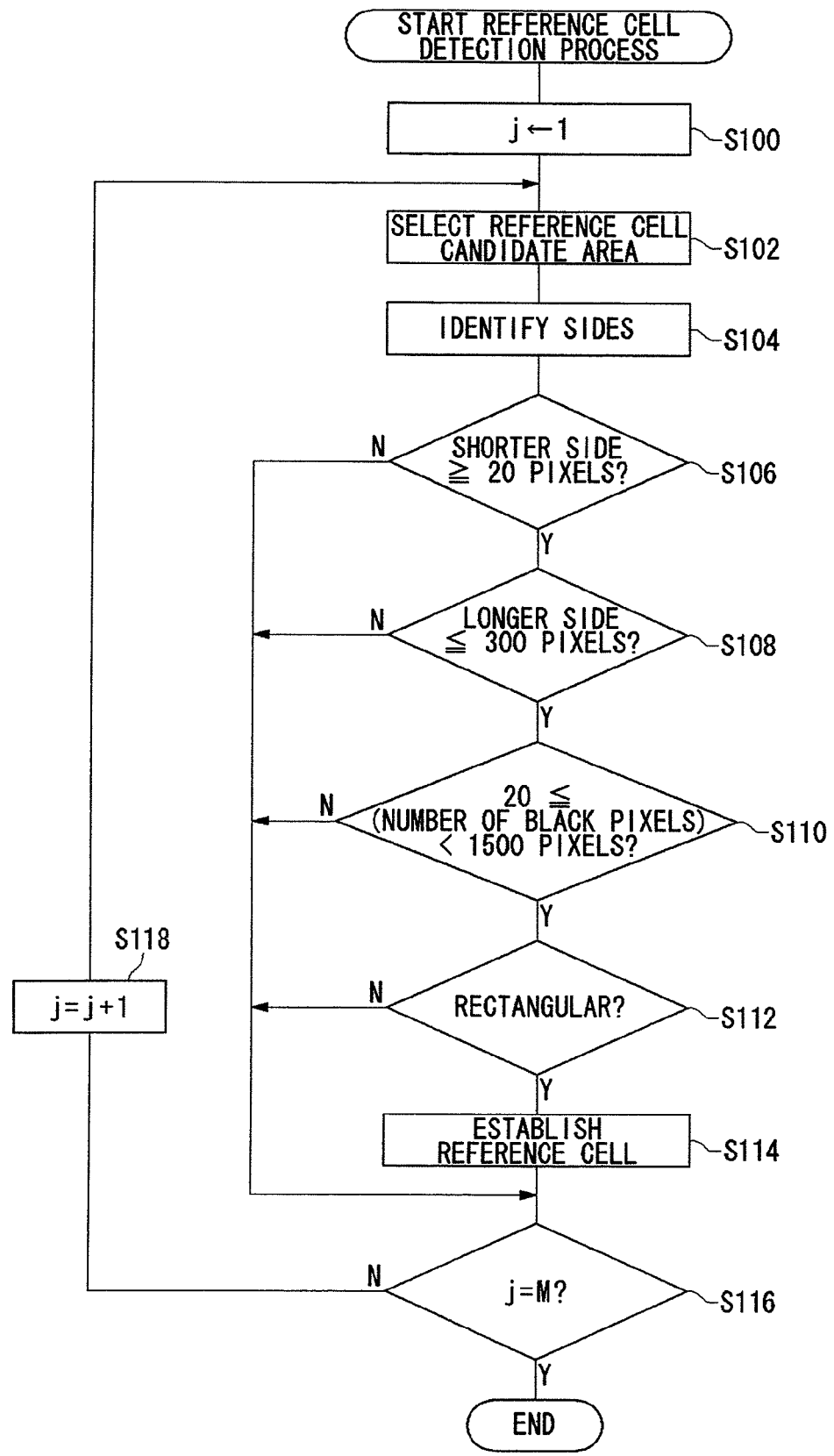
FIG. 5 is a flowchart showing the process of detecting a reference cell.

FIG. 5 is a flowchart showing the process of detecting a reference cell. The pixel counts entered in the flowchart depend on, for example, the resolution of the imaging apparatus 2. The pixel counts entered here are by way of example and are provided for ease of understanding. The reference cell detector 52 reads the total number M of linked areas of black pixels labeled in S12 of FIG. 4 and initializes the counter value j to 1 (S100). Subsequently, the reference cell detector 52 starts searching for linked areas of black pixels at the starting point established in S16 or S18 of FIG. 4 and continues the search, in a counterclockwise spiral on the screen of the display 7. The first linked area of black pixels detected is selected as a reference cell candidate area (S102). The reference cell detector 52 extracts the edges of the reference cell candidate area thus selected and identifies the shorter side and the longer side (S104).

The reference cell detector 52 determines whether the shorter side comprises a predetermined number of pixels (e.g., 20 pixels or more) (S106). The shorter side of the reference cell 100 is designed to be 1.5 blocks long. Thus, if the shorter side of a reference cell 100 comprises less than 20 pixels, the length of 1 block will comprise fewer pixels. That will mean that the number of pixels in one side of the rectangular cell 106, the smallest constituting element in the two-dimensional code, will be 13 or fewer. In this case, the imaging apparatus 2 cannot properly captures an image. Therefore, if the shorter side is determined to comprise less than 20 pixels (N in S106), it is determined that the linked area of black pixels selected in S102 is not the reference cell 100, whereupon control proceeds to S116.

If the shorter side is determined to comprise 20 pixels or more (Y in S106), the reference cell detector 52 determines whether the longer side of the reference cell candidate area comprises a predetermined number of pixels (e.g., 300 pixels or fewer) (S108). Given that the longer side of a reference cell 100 comprises, for example, more than 300 pixels, the length of 1 block, determined as $1/7$ of the length of the longer side, will grow so large that the bottom right cell 104c and the bottom left cell 104d 8.5 blocks away from the reference cell 100 will fail to be captured by the imaging apparatus 2. Therefore, if the longer side is determined to comprise more than 300 pixels (N in S108), it is determined that the linked area of black pixels selected in S102 is not the reference cell 100, whereupon control proceeds to S116.

If it is determined that the longer side comprises 300 pixels or less (Y in S108), the reference cell detector 52 determines whether the total number of black pixels in the reference cell candidate area is no less than 20 and less than 1500 (S110). If the total number of black pixels is less than 20 (N in S110), the same problem as described above, occurring if the shorter side comprises less than 20 pixels, arises. If the total number of black pixels is 1500 or more (N in S110), the same problem as described above, occurring if the longer side comprises 300 pixels or more, arises. Accordingly, a determination is made in these cases that there is little likelihood that the reference cell candidate area is the reference cell 100, whereupon control proceeds to S116.

If the total number of black pixels in the reference cell candidate area is no less than 20 and less than 1500 (Y n S110), the reference cell detector 52 determines the rectangularity of the reference cell candidate area (S112). The rectangularity is determined by referring to the moment of the reference cell candidate area, as described in patent document 1. If it is determined that the area is not rectangular (N in S112), it is determined that the reference cell candidate area is not the reference cell 100, whereupon control proceeds to S116. If it is determined that the reference cell candidate area is rectangular (Y in S112), the reference cell detector 52 establishes the reference cell candidate area as the reference cell 100 (S114) and stores in the RAM the label number assigned to the linked area of black pixels determined as the reference cell candidate area. In this way, the reference cell 100 is detected. If the image data includes only one game card 4, the process for detection of the reference cell is terminated when the reference cell 100 is detected. If there are multiple game cards 4 are possibly included, control proceeds to S116.

The reference cell detector 52 determines whether a count j is equal to the total number M of the reference cell candidate areas (S116). If the count j has not reached M (N in S116), the count j is incremented by 1 (S118), whereupon control proceeds to S102. If the count j has reached M (Y in S116), the reference cell detection process is terminated.

Referring back to FIG. 4, if the reference cell 100 is not detected in the reference cell detection process of S20 (N in S22), it means that the game card 4 is not identified, whereupon the process for recognition of the two-dimensional code is terminated. If the reference cell 100 is detected (Y in S22), the process of detecting a code field is performed (S24).

Figure 6:
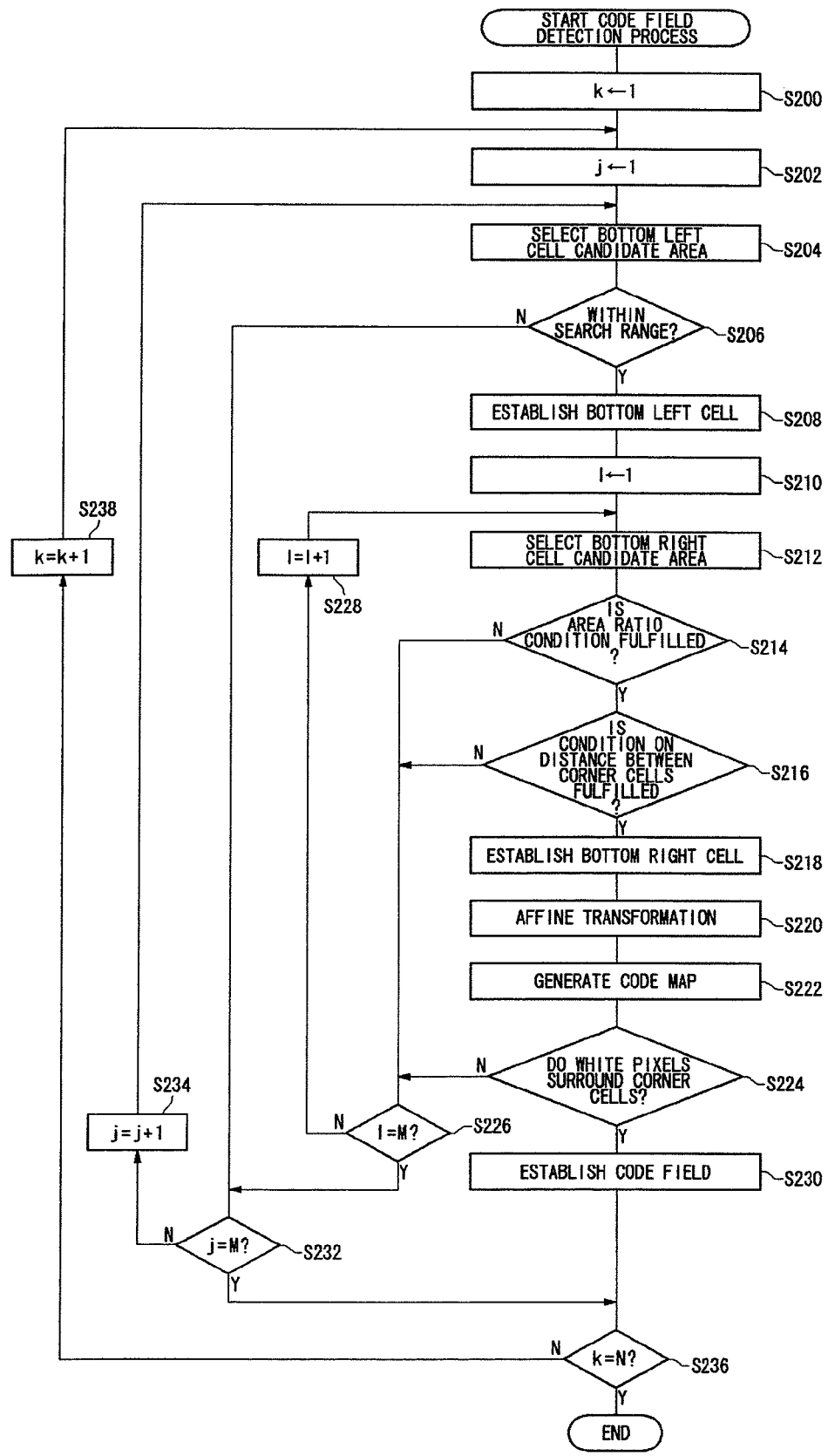
FIG. 6 is a flowchart showing the process of detecting a code field.

FIG. 6 is a flowchart showing the process of detecting a code field. The code field detector 54 reads the total number N of reference cells 100 established in S114 of FIG. 5 and initializes a count k to 1 (S200). It will be assumed here that the reference cells 100 established in S114 are numbered in the order of establishment. Subsequently, the code field detector 54 reads the total number M of the linked areas of black pixels labeled in S12 of FIG. 4 and initializes the count j to 1 (S202). The code field detector 54 detects the linked area of black pixels corresponding to the count j and selects the area as a bottom left cell candidate area (S204).

The code field detector 54 then determines whether the bottom left cell candidate area thus selected is located within a search range predefined with respect to the reference cell 100 detected in S20 of FIG. 4 and assigned a number corresponding to the count k (S206). The positional relationship between the reference cell 100 and the bottom left cell 104d is predefined as shown in FIG. 2. Accordingly, it is possible to narrow a range of search for the bottom left cell by referring to the coordinate data for the reference cell 100. Since the reference cell 100 is a horizontally elongated rectangle, the search range may be limited to two positions opposite to the longer side. If the corner cell candidate area is not located within the search range (N in S206), it is determined that the associated linked area of black pixels is not the bottom left cell 104d, whereupon control proceeds to S232. If the corner cell candidate area is located within the search range (Y in S206), the associated linked area of black pixels is established as the bottom left cell 104d (S208).

Following the establishment of the bottom left corner cell 104d, the code field detector 54 initializes to 1 a count l, another counter value indicating the number identifying a linked area of black pixels (S210). The code field detector 54 detects a linked area of black pixels assigned the number corresponding to the count l. The code field detector 54 selects the area as a bottom right cell candidate area (S212).

Subsequently, the code field detector 54 calculates a ratio between the number of pixels (occupied area) in the bottom left cell 104d established in S208 and the number of pixels (occupied area) in the bottom right candidate area selected in S212. The code field detector 54 determines whether the ratio (area ratio) is, for example, no less than 1/6 and no more than 6 (S214). The number of pixels in the corer cells 104 acquired in imaging varies with the distance from the imaging apparatus 2. More specifically, the closer to the imaging apparatus 2, the larger the area. The more distant, the smaller the area. For this reason, areas represented in the image data may differ from corner cell to corner cell. However, it is normally quite unlikely that the ratio between the bottom left cell and the bottom right cell is below 1/6 or exceeds 6 (N in S214). A candidate that yields such a ratio cannot be identified as a corner cell in a given two-dimensional code and prompts the control to proceed to S226.

If the area ratio is no less than 1/6 and no more than 6 (Y in S214), the code field detector 54 determines whether the distance between the center point in the bottom left cell 104d and the center point in the bottom right cell candidate area selected in S212 fulfills a predefined condition (S216). The predefined condition may be that the distance between the center points approximates the length of the longer side of the reference cell 100. If the predefined condition is not fulfilled (N in S216), control proceeds to S226. If the predefined condition is fulfilled (Y in S216), the code field detector 54 establishes the linked area of black pixels as the bottom right cell 104c (S218).

Once the left bottom cell 104d and the right bottom cell 104c are established, the code field detector 54 subjects the reference cell 100, the bottom left cell 104d, the right bottom cell 104c to affine transformation in the X-direction and Y-direction on the screen of the display 7 (S220). The length of 1 block is calculated based upon the length of the longer side or the shorter side of the reference cell 100 established in S20. The code detector 54 generates a code map from the image obtained by affine transformation, by mapping, into cells, the linked areas of black pixels included in the code field 110 (S222).

The code detector 54 identifies the four corner cells 104 from among the cells in the code map thus generated. The code detector 54 then determines whether 3 block areas surrounding the corer cells 104 comprise white pixels (S224). If the 3 block areas surrounding the corner cells 104 are comprised of white pixels (Y in S224), the code map is established as the code field 110 in the two-dimensional code (S230), whereupon control proceeds to S236. If the 3 block areas surrounding the corner cells 104 are not comprised of white pixels, control proceeds to S226.

In S226, a determination is made as to whether the count i is equal to the total number M of the linked areas of black pixels. If the count i is equal to M (Y in S226), control proceeds to S232. If not (N in S226), the count i is incremented by 1 (S228), whereupon control is returned to S212.

In S232, a determination is made as to whether the count j is equal to the total number M of the linked areas of black pixels. If the count j is equal to M (Y in S232), control proceeds to S236. If not (N in S232), the count j is incremented by 1 (S234), whereupon control is returned to S204.

In S236, a determination is made as to whether the count k is equal to the total number N of the reference cells 100. If the count k is not equal to N (N in S236), the count k is incremented by 1 (S238), whereupon control is returned to S202. In this way, multiple two-dimensional codes in the image data can be identified through the search. If the count k is equal to N (Y in S236), the process for detection in the code field 110 is completed.

Referring to FIG. 4, if the code field 110 is not detected in the code field detection process of S24 (N in S26), it means that no two-dimensional codes are identified, whereupon the process for recognition of two-dimensional codes is terminated. If the code field 110 is detected (Y in S26), the process of verifying code data is performed (S28).

Figure 7:
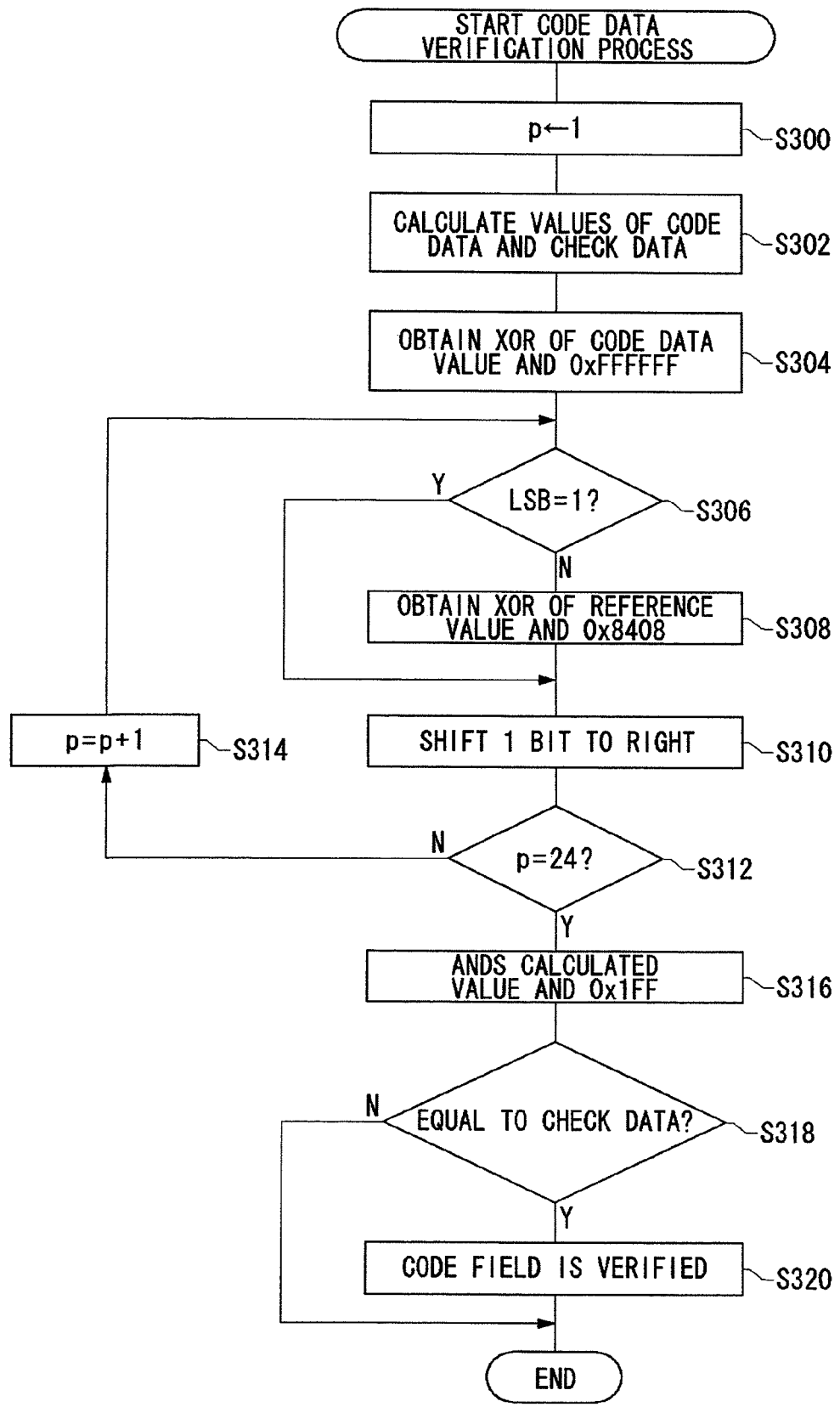
FIG. 7 is a flowchart showing the process of verifying code data.

FIG. 7 is a flowchart showing the process of verifying code data. As already mentioned, the 33-bit code data comprises 9-bit check data which is generated according to a predetermined algorithm and 24-bit information data. In the verification process, the code data is verified using the check data. The process of verifying code data proceeds by generating check data from the code data according to the algorithm and checking the check data thus generated against the check data in the code data.

Initially, the verification processor 56 initializes to 1 a count p, which indicates the number of times that reference values calculated in S304 and S308 (described later) are shifted 1 bit to the right (S300). Subsequently, the verification processor 56 calculates the values of the code data and the check data by referring to the code map in the code field 110 (S302).

The verification processor 56 obtains an exclusive-OR of the code data value thus calculated (bit stream) and 0xFFFFFF (S304). The resultant value (bit stream) is designated as a reference value (reference bit stream). A determination is made as to whether the least significant bit (LSB) of the reference bit stream is set to "1" (S306). If the LSB is not set to "1" (N in S306), the verification processor 56 obtains an exclusive-OR of the reference value (reference bit stream) and 0x8408 (S308). The resultant value (bit stream) is designated as a new reference value (reference bit stream), whereupon control proceeds to S310. When the LSB is set to "1" (Y in S306), control similarly proceeds to S310.

The verification processor 56 shifts the reference values (reference bit stream) calculated in S304 or in S308 1 bit to the right (S310) and determines whether the count p is equal to a predetermined number of shifts, which is 24 (S312). If it is determined that p≠24 (N in S312), the count p is incremented by 1 (S314), whereupon control proceeds to S306.

If it is determined that p=24 (Y in S312), the calculated bit stream is ANDed with 0x1FF (S316). The verification processor 56 determines whether the result obtained by the logical AND operation is equal to the check data value calculated (S318). If it is determined that the result from the logical AND operation is equal to the check data value (Y in S318), the verification processor 56 determines that the code field 110 detected in S24 of FIG. 4 has a proper two-dimensional code pattern, verifying the code field 110 of the two-dimensional code (S320). If the result of the logical AND operation does not match the check code value (N in S318), the verification processor 56 determines that the reading of the code field 110 is in error, whereupon the process of verifying code data is terminated. While FIG. 7 only shows the process of verifying one code field 110, the verification process is performed for each of the multiple code fields 110 if detected.

Referring back to FIG. 4, if the code field 110 is not verified (N in S30) in the process of detecting code data of S28, it means that no two-dimensional codes are identified, whereupon the process for recognition of two-dimensional codes is terminated. If the code field 110 is verified (Y in S30), the code data value (i.e. the value of the two-dimensional code) is stored in, for example, the RAM and maintained therein (S32). This completes the process for recognition of two-dimensional codes.

A description will now be given of how the position and orientation of the game card 4 in the three-dimensional coordinate system are determined. To obtain the position and orientation of the game card 4 in the virtual three-dimensional coordinate system, the angle of view of the imaging apparatus 2, the screen resolution, the coordinate position of the four corner cells and the actual distance between the corner cells 104 are used in this example. The term "screen" refers to the screen of the display 7 displaying the image captured by the imaging apparatus 2.

(Step 1)

Initially, the distance between a viewpoint and a plane of projection (screen) is determined. The distance between the viewpoint and the plane of projection (screen) is determined by referring to the angle of view of the camera and the screen resolution.

Assuming that the horizontal angle of view of the camera is denoted by θ, the horizontal screen resolution is denoted by W and the distance between the viewpoint and the plane of projection (screen) is denoted by P, the following relationship holds:

$$P=(W*0.5)/\tan(\theta*0.5)$$

(Step 2)

A three-dimensional vector pointing from the viewpoint to each of the corner cells 104 will be determined next.

Given that the screen coordinate position of a corner cell is denoted by SX and SY, the distance between the viewpoint and the plane of projection (screen) is denoted by P, and the three-dimensional vector V pointing to the corner cell is denoted by V, the following relationship holds.

$$V=(SX,SY,P)$$

The screen coordinate position is defined with respect to the center of the screen as the origin.

(Step 3)

Normal vectors normal to a plane formed by three points including the viewpoint and two adjacent corner cells are determined. A total of four normal vectors are generated. Given that a three-dimensional vector pointing from the viewpoint to the corner cell 104*a* is denoted by V1, a three-dimensional vector pointing from the viewpoint to the corner cell 104*b* is denoted by V2, a three-dimensional vector pointing from the viewpoint to the corner cell 104*c* is denoted by V3, a three-dimensional vector pointing from the viewpoint to the corner cell 104*d* is denoted by V4, a normal vector normal to a plane formed by the viewpoint and the corner cells 104*a* and 104*b* is denoted by S12, a normal vector normal to a plane formed by the viewpoint and the corner cells 104*b* and 104*c* is denoted by S23, a normal vector normal to a plane formed by the viewpoint and the corner cells 104*c* and 104*d* is denoted by S34, and a normal vector normal to a plane formed by the viewpoint and the corner cells 104*d* and 104*a* is denoted by S41, the following relationship holds.×

$$S12=V1\times V2$$

$$S23=V2\times V3$$

$$S34=V3\times V4$$

$$S41=V4\times V1$$

where "x" denotes a cross product.

(Step 4)

Subsequently, the orientation (coordinate axes) of the game card 4 in the three-dimensional space is determined. The coordinate axes of the card are determined based upon the four normal vectors determined in step 3.

Given that the X axis of the local coordinate system of the card (running in the horizontal direction on the surface of the card) is denoted by VX, the Y axis of the local coordinate system of the card (running in the direction passing through the surface of the card) is denoted by VX, and the Z axis of the local coordinate system of the card (running in the vertical direction on the surface of the card) is denoted by VZ, the following relationship holds.

$$VX=S12\times S34$$

$$VZ=S23\times S41$$

$$VY=VZ\times VX$$

(Step 5)

Finally, the position of the game card 4 in the three-dimensional space is determined. In step 4, a matrix for converting into local coordinates of the game card 4 is obtained. The position of the card is easily determined if the actual distances between the corner cells are known. Using the position of the corner cell 104*a* in the three-dimensional coordinate system as a variable, the positions of the corner cells 104*b*, 104*c* and

104d in the three-dimensional coordinate system can be represented using the variable. Since the positions of the four corner cells in the screen coordinate system are known, the position of the game card 4 in the three-dimensional coordinate system is identified by finding a solution to simultaneous equations of the resultant expressions.

As described above, the use of the two-dimensional code shown in FIG. 2 helps improve the rate of recognition of the code field 110. Moreover, the positions of the corner cells 104 in the two-dimensional coordinate system can be accurately determined. More specifically, by forming the corner cells 104 to be relatively large, the center positions of the corner cells 104 are determined accurately so that the position of the game card 4 is determined accurately. By determining the center positions of the multiple corner cells 104 accurately, the positional relationship between the reference cell 100 and the corner cell 104 is known accurately so that the precision in affine transformation is improved. Thereby, the position and orientation of the game card 4 can be determined accurately.

Figure 8:
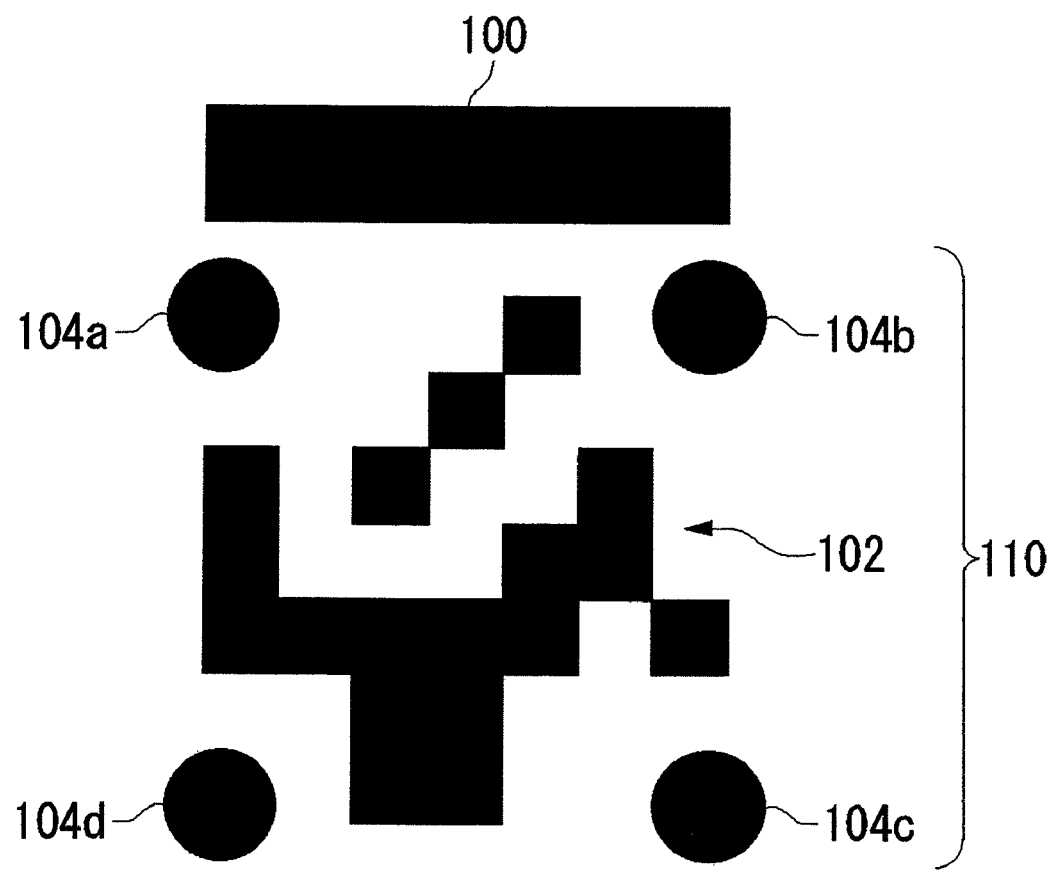
FIG. 8 shows another example of two-dimensional code printed on the surface of a game card.

FIG. 8 shows another example of two-dimensional code printed on the surface of a game card. The reference cell 100 having a predetermined shape and the code field 110 are provided on the surface of the game card 4. Compared with the two-dimensional code of FIG. 2, the two-dimensional code shown in FIG. 8 is designed such that the multiple corner cells 104a, 104b, 104c and 104d surrounding the code data field 102 are circular in shape. As mentioned already, the two-dimensional coordinate position of a corner cell 104 is identified by the center point of the corner cell 104. By configuring the corner cell 104 to have a circular shape, it is ensured that the shape of the corner cell 104 imaged by the imaging apparatus 2 remains unchanged irrespective of the orientation of the game card 4 with respect to the imaging apparatus 2. Consequently, the center point of the corner cell 104 does not vary with the orientation with respect to the imaging apparatus 2. Therefore, the center point can be acquired consistently. This enables accurate determination of the position information, the orientation information and the distance information of the game card 4. The rectangular cells 106 may be formed to have a circular shape. Not only by configuring the corner cells 104 to have a circular shape but by forming the corner cells 104 to be larger than the rectangular cells 106, as described with reference to FIG. 2, the coordinate position of the corner cells 104 can be determined with higher precision.

Figure 9:
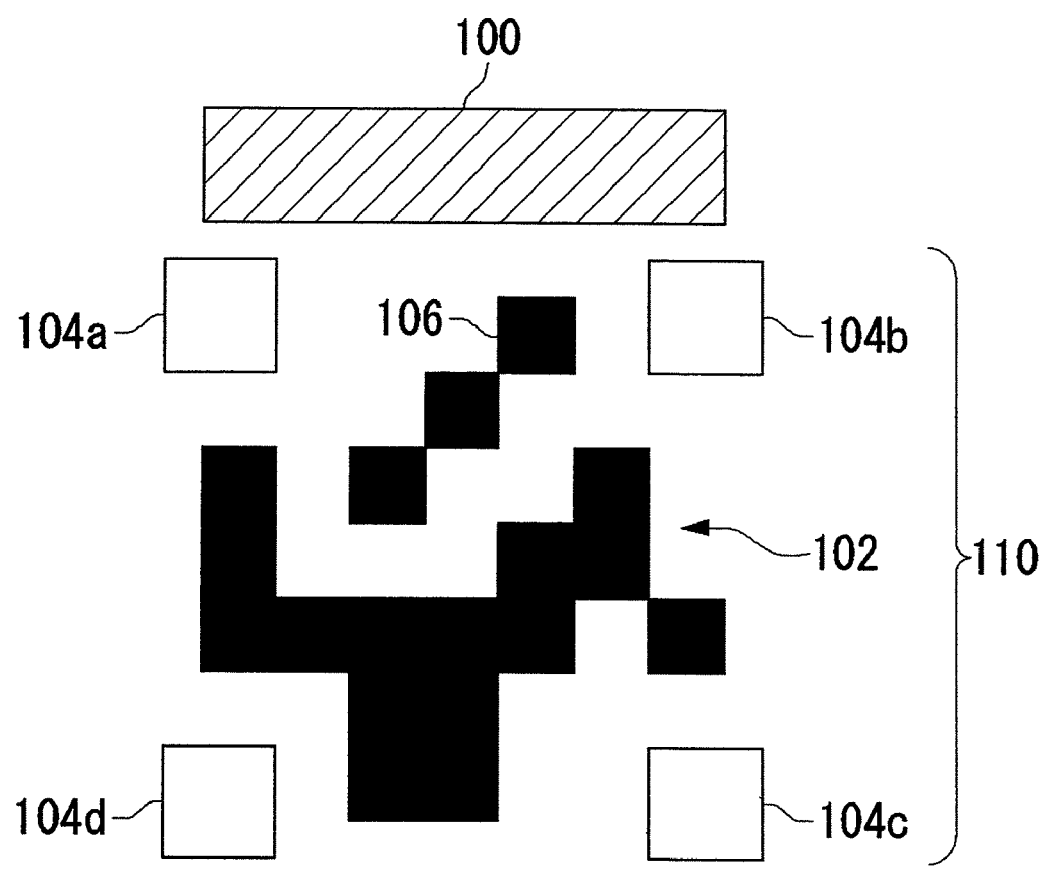
FIG. 9 shows still another example of two-dimensional code printed on the surface of a game card.

FIG. 9 shows another example of two-dimensional code printed on the surface of a game card. The reference cell 100 and the code field 110 are provided on the surface of the game card 4. Compared with the two-dimensional code of FIG. 2, the two-dimensional code of FIG. 9 is designed such that at least one of the following cells is colored differently from the other cells: a) the reference cell 100 having a predetermined shape, b) the multiple rectangular cells 106 constituting code data by forming a two-dimensional array, and c) the multiple corner cells 104 provided to surround the code data field 102. For example, red may be assigned to the reference cell 100, green to the rectangular cells 106 and blue to the corner cells 104. What is essential is that the color assigned can be imaged by the imaging apparatus 2 and binarized with reference to a predetermined threshold. The color need not be visible to the human eye. If the imaging property of the imaging apparatus 2 is known in advance, the cells may be colored in accordance with the property.

A prerequisite for the process for recognition of two-dimensional codes according to this example is that the reference cell 100 is detected first as shown in S20 of FIG. 4. The load incurred in processing the detection of the reference cell is high in the context of overall process for recognition of two-dimensional codes. Accordingly, it is preferable that the reference cell 100 be efficiently detected in the image data. Of the multiple types of cells, it is thus preferable that the at least the reference cell 100 be assigned a color different from the rectangular cells 106 and the corner cells 104.

An RGB color filter is provided in front of the light receiving surface of the imaging apparatus 2. Each frame image is represented by pixel values in the RGB format scaled to a 256 grayscale. In this example, the binarization processor 50 has the function of setting up a range of pixel values in the RGB format for the purpose of binarization. Given that the reference cell 100 is painted over with red, the binarization processor 50 sets up a range of pixel values in the RGB format for binarization of the reference cell, in the binarization process in S10 of FIG. 4. For example, the binarization processor 50 sets up a range 200-255 of red (R) pixel values, a range 0-100 of green (G) pixel values and a range 0-100 of blue (B) pixel values. The binarization processor 50 extracts pixels in the composite RGB format within these ranges and codes their pixel values as binary "1s". For example, a pixel in the composite format having an R pixel value of 225, a G pixel value of 30 and a B pixel value of 50 is coded as binary "1" and assigned the color black in a binary image. If a pixel value in the composite RGB format does not fit within these ranges, the pixel value is coded as binary "0" and the pixel is assigned the color white in a binary image. Extracting red pixels from the image data as described above enables linked areas represented as black pixels in a binary image to be labeled in S12 of FIG. 4. By targeting a particular color (in this case, red) for extraction of selected pixels in image data as black pixels, the number of noises extracted is reduced. Time required for the reference cell detector 52 to detect the reference cell 100 in the binary data for the frame image is also reduced.

Since the pixel values are affected by the property of a color filter, the red pixel values of the reference cell 100 may be examined while the game card 4 is being placed on the table 3, in order to establish pixel value ranges that allow for the property of a color filter. The above process enables determining the pixel values of the reference cell 100 in the RGB format acquired by the imaging apparatus 2. By subjecting the pixel values thus determined to binarization, tolerating a certain margin for error, the number of linked area of black pixels detected is significantly reduced. Since real-time processing is desired in the game system 1, efficient extraction of the reference cell 100 offers significant benefits.

The aforementioned procedure can also deal with other types of cells (e.g., the corner cells 104 or the rectangular cells 106) which are colored. If the corner cells 104 are colored blue, the binarization processor 50 establishes the RGB pixel value ranges for the corner cells in S10 of FIG. 4. For example, the binarization processor 50 may set up a range 0-100 of red (R) pixel values, a range 0-100 of green (G) pixel values and a range 200-255 of blue (B) pixel values. The binarization processor 50 extracts pixels in the composite RGB format within these ranges and codes their pixel values as binary "1s". For example, a pixel in the composite format having an R pixel value of 20, a G pixel value of 30 and a B pixel value of 240 is coded as binary "1" and assigned the color black in a binary image. If the pixel value in the composite RGB format does not fit within these ranges, the pixel value is coded as binary "0" and the pixel is assigned the color white in a binary image. Extracting blue pixels from the image data as described above enables linked areas represented as black pixels in a binary image to be labeled in S12 of FIG. 4.

As described, an image predominantly bluish in color is binarized for conversion into a black image and labeled in S12 as a linked area of black pixels, before being selected by the code field detector 54 as a corner cell candidate area as shown in the flow of FIG. 6. By targeting a particular color (in this case, blue) for extraction of selected pixels in image data as black pixels, the number of noises extracted is reduced. Time required for the code field detector 54 to detect the corner cells 104 in the binary data for the frame image is reduced. If the rectangular cells 106 are colored green, an image predominantly greenish in color is binarized for conversion into a black image in S10 of FIG. 4 and labeled as a linked area of black pixels in S12 before being used to generate a code map in S222 of FIG. 6. If the three types of cells are colored differently, the number of times that binarization processes are carried out is increased. Overall, however, the efficiency is improved since the processing volume required to search for the linked area after binarization is significantly reduced.

The two-dimensional code shown in FIG. 9 is provided with colored cells. The colored cells may be formed to be large. Alternatively, they may be formed to be circular in shape, as shown in FIG. 8.

Figure 10:
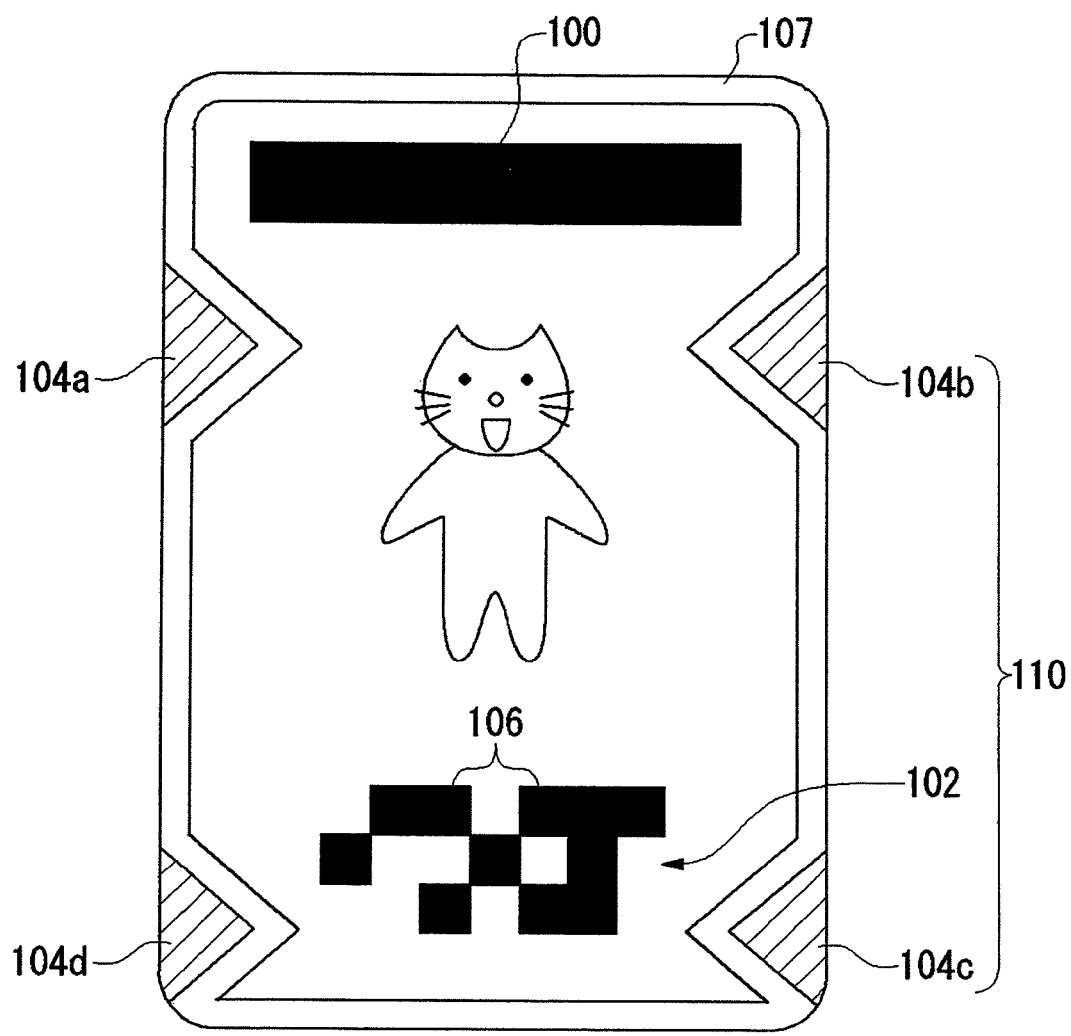
FIG. 10 shows yet another example of two-dimensional code printed on the surface of a game card.

FIG. 10 shows another example of two-dimensional code printed on the surface of a game card. The reference cell 100 and the code field 110 are provided on the surface of the game card 4. The two-dimensional code shown in FIG. 10 is an embodiment of the two-dimensional code shown in FIG. 9. The two-dimensional code shown in FIG. 10 is provided with the reference cell 100 having a predetermined shape, the multiple rectangular cells 106 constituting code data by forming a two-dimensional array, and the multiple corner cells 104 provided to surround the code data field 102. The four corner cells 104a, 104b, 104c and 104d are identically colored, but are colored differently from the reference cell 100 and the rectangular cells 106.

For improvement of the appearance of the game card 4, the corner cells 104 are aligned to the respective side edges of the game card 4. The corner cells 104 are provided in proximity to the four corners of the game card 4 and are formed to be larger than the rectangular cells 106. As such, the four corner cells 104 stand out from the other features on the game card 4. The corner cells 104 are originally intended as provisions to specify the location of the rectangular cells 106 but the appearance thereof should also count so long as the game card 4 is used as such. In this respect, the border edge 107 delineating the game card 4 is designed with a twist such that it curves inward as it reaches the corner cells 104 and skirts the corner cells 104, resulting in the sophisticated design of the corner cells 104.

When the corner cells 104 are aligned to the respective side edges of the game card 4, it is preferable that the corner cells 104 are assigned a color other than black. Assuming that the corner cells 104 are colored black, imaging of the game card 4 by the imaging apparatus 2 and subsequent binarization may result in shadows, occurring at the edge of the game card 4, being converted into black pixels, with the result that the two corner cells 104 converted into black pixels being linked to each other via the shadows at the edge of the game card 4. If the two corner cells 104 are linked through binarization, it will be difficult to isolate the two corner cells 104 from the linked black pixels. This calls for assigning a color other black to the corner cells 104 and setting up the range of RGB threshold values (i.e., the ranges of RGB values) for binarization appropriately, in order to avoid a situation in which corner cells 104 are linked due to a shadow at the edge of the game card 4. As described, in case the corner cells 104 are aligned to the respective side edges of the game card 4, the corner cells 104 can be properly extracted by assigning thereto a color other than that of shadows, i.e., a color other than black.

In the game card 4 shown in FIG. 10, the corner cells 104 are formed to be triangular in shape. The corner cells 104 may be formed as regular triangles. By forming the corner cells 104 as regular triangles, the precision in recognition of the corner cells 104 is improved.

Figure 11A:
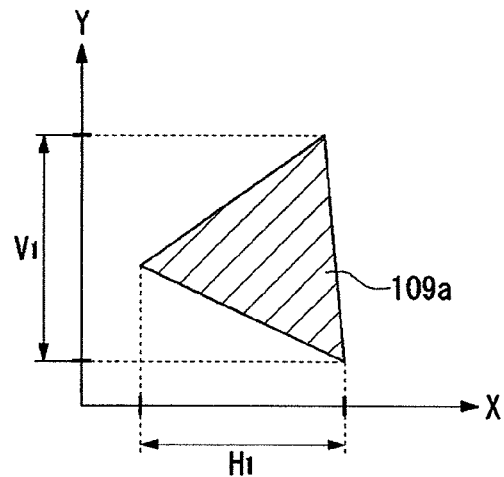
FIGS. 11A-11C are charts showing a method of determining whether a corner cell is found.
Figure 11B:
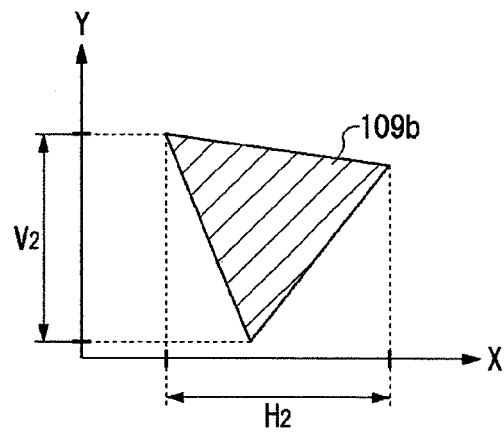
Figure 11C:
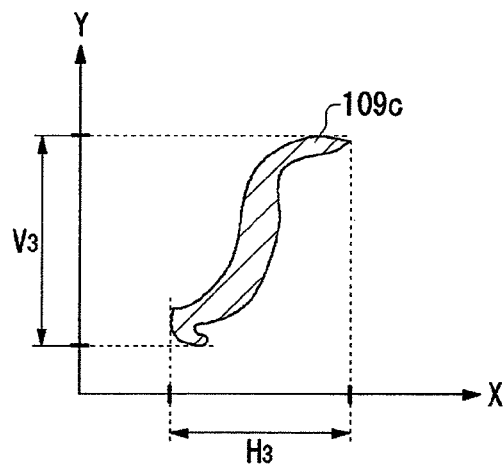

FIGS. 11A-11C are charts showing a method of determining whether black pixels extracted represent a corner cell 104. As already described, a determination on the corner cells 104 is made by referring to a linked area of black pixels identified as a result of binarization of a frame image. A binarized frame image can be represented in a two-dimensional X-Y coordinate system. Therefore, by using coordinate values representing the linked area, a determination can be made as to whether the linked area represents the corner cell 104.

FIG. 11A shows an example of linked area extracted from a frame image. The width of a linked area 109a in the X-axis direction is denoted by $H_1$, and the width in the Y-axis direction is denoted by $V_1$. The width is represented by the number of pixels in the two-dimensional coordinate system. Given that the number of pixels in the linked area 109a is denoted by $C_1$, whether the linked area 109a is a candidate for the corner cell 104 is made by using the following expression.

$$\alpha \times H_1 \times V_1 \leq C_1 \leq \beta \times H_1 \times V_1 \ (\alpha < \beta < 1)$$

For example, $\alpha$ is equal to 0.3 and $\beta$ is equal to 0.7.

If the number of pixels $C_1$ in the linked area 109a fulfills the above expression, a determination may be made that the linked area 109a is a candidate for the corner cell 104. Naturally, the constants $\alpha$ and $\beta$ may be set to other values.

FIG. 11B shows another example of linked area extracted from a frame image. Whether a linked area 109b is a candidate for the corner cell 104 is similarly determined according to the following expression.

$$\alpha \times H_2 \times V_2 \leq C_2 \leq \beta \times H_2 \times V_2 \ (\alpha < \beta < 1)$$

where $C_2$ denotes the number of pixels in the linked area 109b, $H_2$ denotes the width of the linked area 109b in the X-axis direction, and $V_2$ denotes the width in the Y-axis direction.

The linked areas shown in FIGS. 11A and 11B are those that fulfill the discriminant and are determined to be candidates for the corner cell 104. As shown in FIGS. 11A and 11B, the angle formed by the game card 4 in the imaging area 5 as it is captured in a frame image may vary. Using the aforementioned discriminant enables the triangular corner cells 104 to be recognized properly.

FIG. 11C shows another example of linked area extracted from a frame image. In this case, the number of pixels $C_3$ in the linked area 109c is smaller than $\alpha \times H_3$ (width in the X-axis direction) $\times V_3$ (width in the Y-axis direction). That is, the relationship $C_3 < \alpha \times H_3 \times V_3$ holds. Since this does not fulfill a discriminant ($\alpha \times H_3 \times V_3 \leq C_3 \leq \beta \times H_3 \times V_3$), the linked area 109c shown in FIG. 11C is determined not to be the corner cell 104.

As described, by forming the corner cells 104 as triangular areas, candidates for the corner cells 104 can be easily extracted, using the coordinate values in the two-dimensional coordinate system. By forming the corner cell 104 as regular triangles, direction dependence of the determination process using the discriminant is reduced as compared to the other triangular shapes. Accordingly, the precision in recognizing the corner cells 104 is further improved.

In the game card 4 shown in FIG. 10, the code data field 102 made up of the rectangular cells 106 are provided between the corner cells 104c and 104d toward the bottom of the card. This will create a space in the center of the game card 4 where a picture of a character may be printed.

Figure 12:
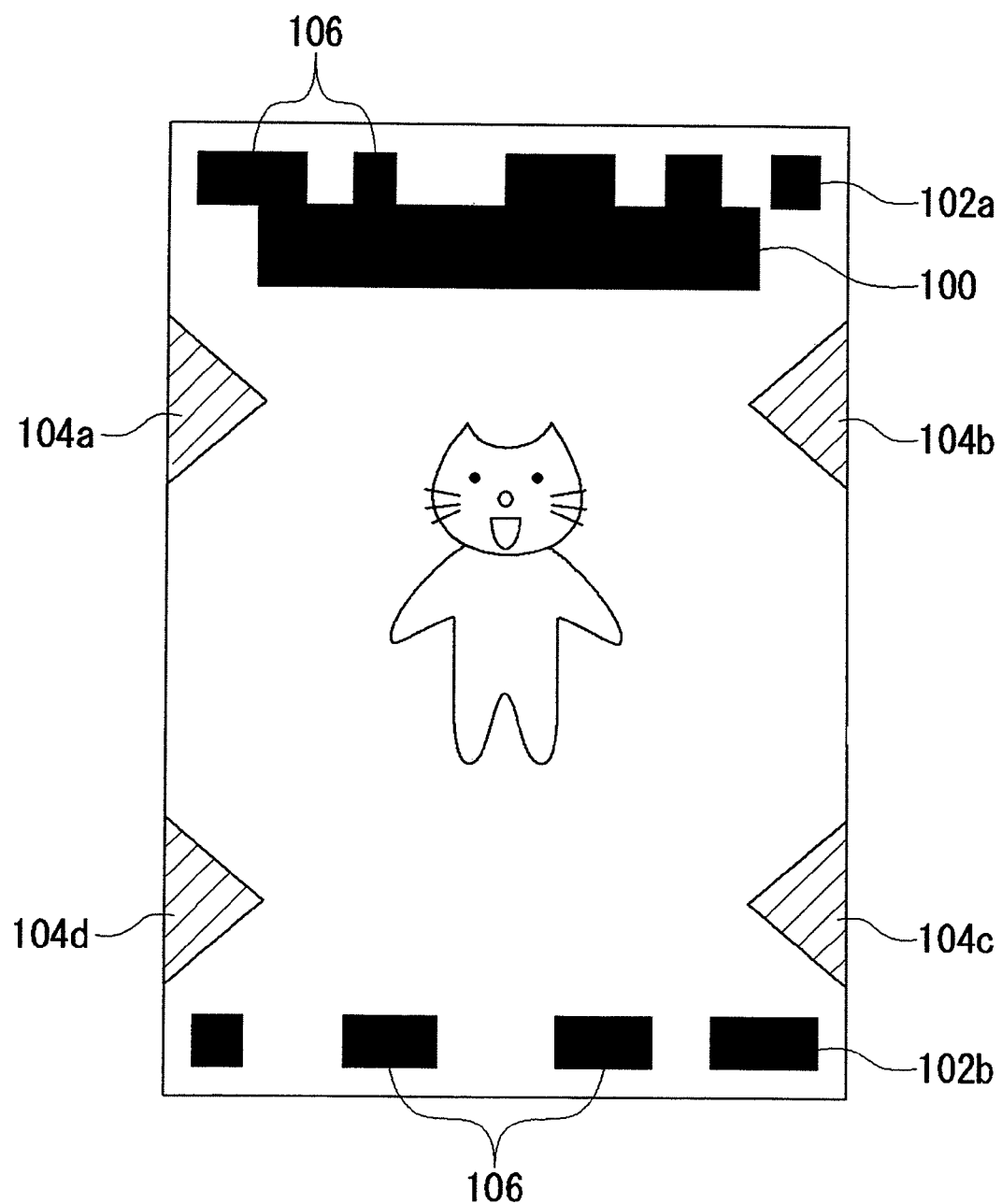
FIG. 12 shows another example of two-dimensional code printed on the surface of a game card.

FIG. 12 shows another example of two-dimensional code printed on the surface of a game card. Similar to the game card 4 shown in FIG. 10, the game card 4 shown in FIG. 12 is designed so that the corner cells 104 are aligned to the respective edges of the game card 4. The corner cells 104 are formed to be triangular in shape and are assigned with a color different from that of the reference cell 100 and code data fields 102a and 102b.

In the game card 4 shown in FIG. 12, there are two mutually isolated areas in which are provided the rectangular cells 106. In this case, the two code data fields 102a and 102b are provided outside the area surrounded by the four corner cells 104a, 104b, 104c and 104d. The code field 102a is formed between the reference cell 100 and the top edge of the game card 4. The code field 102b is formed between a line connecting the corner cells 104c and 104d and the bottom edge of the game card 4. The line connecting the corner cells 104c and 104d is a line connecting the vertices of the triangles facing inward. By providing the code data field 102a and the code data field 102b outside the area surrounded by the four corner cells 104, a relatively large space is made available in the center of the game card 4, where an image of a character may be printed. Each of the code data field 102a and the code data field 102b can contain 12-bit information. Therefore, in total, 24-bit information can be contained. It is preferable that the code data field 102b provided toward the bottom of the game card 4 not include a predetermined sequence of colored bits or longer (e.g., a sequence of 3 bits or longer) in order to prevent it from being misidentified as the reference cell 100.

When the rectangular cells 106 of FIG. 12 are targets of recognition, the reference cell 100 and the bottom left and bottom right corner cells 104d and 104c have already been detected. Therefore, the code data fields 102a and 102b can easily be detected by searching the neighborhood area. More specifically, the code data field 102a is located opposite to the corner cells 104c and 104d with respect to the reference cell 100. The code data field 102b is located opposite to the reference cell 100 with respect to the corner cells 104c and 104d. By providing the reference cell 100 and the code data field 102a in proximity to each other and by providing the corner cells 104c and 104d in proximity to the code data field 102b, efficiency of the search for the code data fields 102 is improved.

While FIG. 12 shows the game card 4 in which the code data fields 102a and 102b are isolated, the code data fields 102a and 102b may be provided adjacent to each other. That is, the code data fields 102a and 102b may be provided between the reference cell 100 and the top edge of the game card 4. Alternatively, they may be provided between the corner cells 104d and 104c and the bottom edge of the game card 4.

In the above description, it is assumed that the game card 4 is moved on the table 3. Alternatively, a game mat may be placed on the table 3 so that the game card 4 is moved on the mat.

Figure 13:
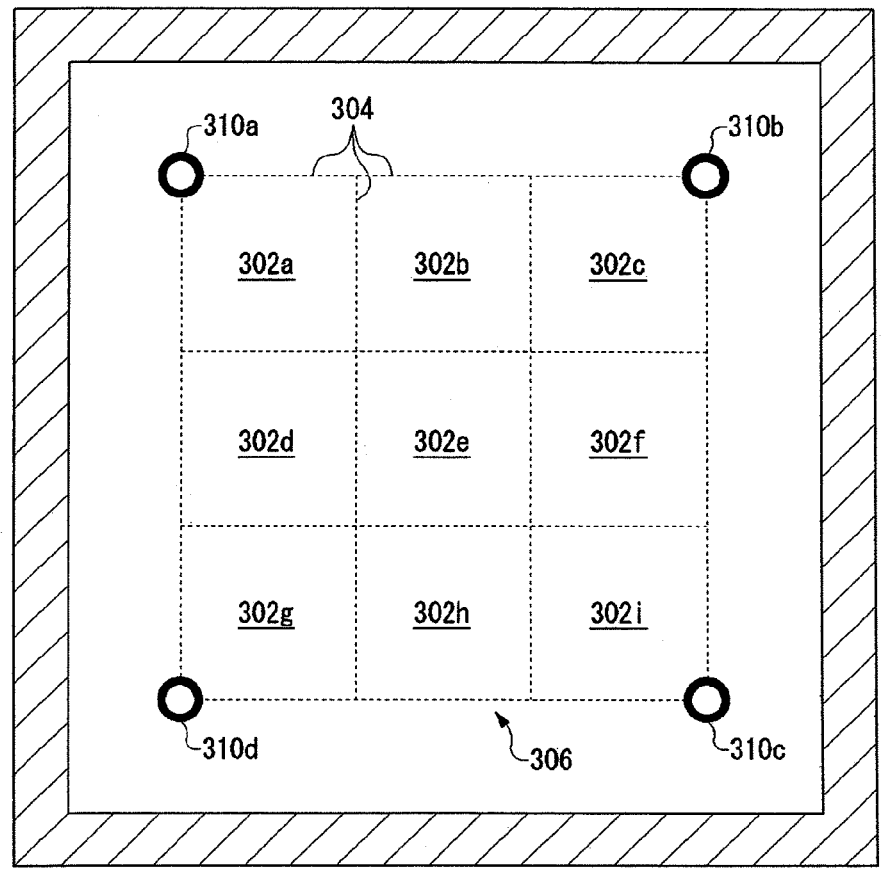
FIG. 13 shows a game mat on which to place a game card.

FIG. 13 shows a game mat on which to place a game card. Referring to FIG. 1, the game mat 300 is placed on the table 3 so as to be located within the imaging area 5 of the imaging apparatus 2. The game mat 300 is fabricated of a soft material such as felt cloth. Preferably, the game mat can be rolled into a compact size for storage when not in use. A total of 9 cells 302a, 302b, 302c, 302d, 302e, 302f, 302g, 302h and 302i (generically referred to as "cells 302") are formed by multiple partition lines 304. The game mat 300 is formed to adapt to the game application for which it is designed. Each cell 302 marks an area in which the game card 4 is placed. When a user places the game card 4 in one of the cells 302, the image analysis apparatus 20 may identify the cell 302 in which the card is placed and may recognize the two-dimensional code on the game card 4 so that a game story that depends on the cell in which the card is placed may develop. In the game mat 300 shown in FIG. 13, a 3×3 array of cells 302 is formed. Alternatively, other numbers of cells may be formed. Referring to the area in which the user can manipulate the game card 4 as a "play area", the square area in which the cells 302 are formed in the game mat 300 shown in FIG. 13 represents a play area 306. It is not essential that the entirety of the game mat 300 be placed within the imaging area 5, whereas the play area 306 should at least be located within the imaging area 5. In a game application in which the user can manipulate the game card 4 at will, the cells 302 need not be formed.

Gradation areas 310a, 310b, 310c and 310d (hereinafter, generically referred to as gradation areas 310) characterized by gradual change in brightness are provided at the four corners of the player area 306 on the game mat 300. A gradation area 310 is formed as gradation of brightness levels in a given hue (one of the three color attributes—hue, brightness and saturation). Saturation need not be varied. The gradation areas 310 are bounded by circles at their outer edge. Brightness levels vary gradually and concentrically from high to low from the center of the gradation area 310 toward the outer edge thereof.

Figure 14:
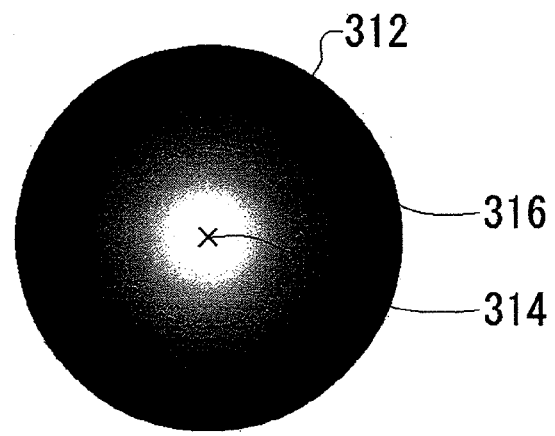
FIG. 14 shows the appearance of a gradation area.

FIG. 14 shows the appearance of the gradation area. The gradation area 310 is comprised of a single hue, in which the brightness varies gradually. Hue represents difference in shades such as red, green and blue. Brightness represents difference in brilliance. It will be assumed here that the gradation area 310 has a hue, i.e., is expressed in a chromatic color. Achromatic colors such as white, black and grey do not have a hue. The gradation area 310 may also be configured to have gradual variation in brightness from white to black. The difference in the brightness in the gradation area 310 is acquired as difference in luminance when digitized by an RGB filter.

Thus, the gradation area 310 is designed such that its brightness level is low at the outer edge 312 and high at the center 314. That is, the gradation area 310 is designed to have an area of intense chromatic color at the outer edge and an blank area toward the center. The four gradation areas 310 may be assigned the same color. By assigning a different color to one of the gradation areas 310, the difference may serve as an index for determining the orientation of the game mat 300. For example, the three gradation areas 310a, 310b and 310c may be assigned the same hue, and the other gradation area 310d may be assigned a different color. Upon successful detection of the four gradation areas 310, the orientation of the game mat 300 is identified since the position of the gradation area 310d with respect to the gradation areas 310a, 310b and 310c is known.

Further, upon successful detection of the gradation areas 310, geometrical information on the game mat 300, such as the position, orientation and distance thereof, can be calculated using a method similar to the one for determination of the position and orientation of the game card 4 in the virtual three-dimensional coordinate system. By knowing the position and orientation of the game mat 300 in advance, the game card 4 provided in the game area 306 can be recognized more efficiently. A description was given with reference to FIG. 1 that the frame image captured by the imaging apparatus 2 is displayed on the display 7 and a character is superimposed on the game card 4 when displayed. In case the game mat 300 is used, the geometrical information on the game mat 300 may be acquired so that a background image of, for example, a battle using the game card 4 may be superimposed on the game mat 300 in a frame image displayed on the display 7. By superimposing a background image on the game mat 300, which is used for efficient recognition of the game card 4, instead of displaying only the game mat 300 on the display 7, presentation effects are improved.

The gradation areas 310 are also used to determine the threshold values of pixel values in the RGB format used for binarization and extraction of the reference cell 100, the corner cells 104 and/or rectangular cells 106 on the game card 4. For example, it will be assumed the corner cells 104 are colored green and the brightness thereof is predetermined. In this case, the gradation area 310 may be colored green and provided with an area where the brightness thereof is the same as that of the corner cells 104. As a result, an area 316 with the same brightness as that of the corner cells 104 is located at a predetermined position between the center 314 of the gradation area 310 and the outer edge 312 thereof. Preferably, the area 316 is formed concentrically at a middle point between the center 314 and the outer edge 312. Accordingly, an area with brightness levels higher than that of the area 316 is provided between the area 316 and the center 314 in the radial direction of the gradation area 310. An area with brightness levels lower than the area 316 is provided between the area 316 and the outer edge 312.

It will be assumed that, given the same hue (G) and the same brightness (gradation) of the corner cells 104 and the area 316 in the gradation area 310, and given that ambient light has no influence, the G pixel value acquired via a G filter is 127. The binarization processor 50 sets up ranges of RGB pixel values for binarization. If the pixel value of the corner cells 104 is known in advance, it is ideal that the ranges set up include pixel values close to the pixel value of the corner cells 104. This is to ensure that those pixels with smaller pixel values than that of the corner cells 104 (i.e., pixels with higher brightness levels) are not extracted as much as possible. Theoretically, the binarization processor 50 in this case may set up a range 120-255 of G pixel values, where 120 represents a threshold value, for extraction of the corner cells 104. This results in images with G pixel values smaller than 120 being coded as "0s". By narrowing the range of G pixel values for binarization, other noises can be reduced.

In real world situations, the pixel value of the corner cells 104 acquired by the imaging apparatus 2 may differ from a theoretical value (127) due to illumination or sunlight entering the imaging apparatus 2. The term "theoretical value" is used for the sake of convenience and means a pixel value extracted from image data in a reference environment. The narrower the range of pixel values set up for binarization, the lower the load in subsequent processes. Meanwhile, pixel values actually acquired may deviate from theoretical values due to influence from ambient light and may lie outside a narrowly set range of pixel values for binarization. The game system 1 according to this example addresses this by calibrating the range of pixel values for binarization, by using the gradation areas 310. A range of pixel values adapted to real-world situations that allows for influence from ambient light is set up.

Figure 15:
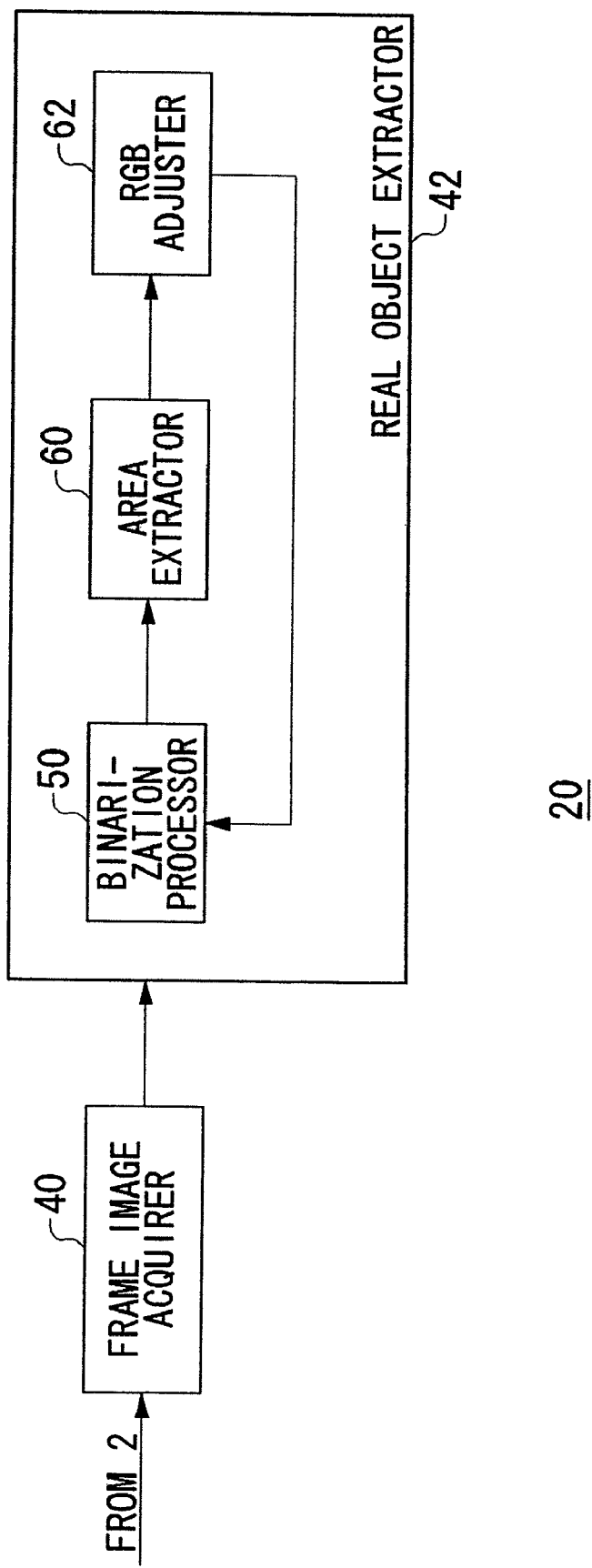
FIG. 15 shows another structure of an image analysis apparatus.

FIG. 15 shows another structure of the image analysis apparatus. The image analysis apparatus 20 is provided with a frame image acquirer 40 and a real object extractor 42. The real object extractor 42 is provided with the binarization processor 50, the area extractor 60 and an RGB adjuster 62. Unlike the block diagram of FIG. 3, FIG. 15 shows a structure whereby the range of pixel values for binarization is subject to calibration. Processing functions of the image analysis apparatus 20 are implemented by a CPU, a memory, a program loaded into the memory, etc. FIG. 15 depicts a structure implemented by the cooperation of the elements. The program may be built in the image analysis apparatus 20 or supplied from an external source in the form of a recording medium. Therefore, it will be obvious to those skilled in the art that the functional blocks may be implemented by a variety of manners including hardware only, software only or a combination of both. In the illustrated example, the CPU of the image analysis apparatus 20 is provided with the functions of the frame image acquirer 40 and the real object extractor 42.

The frame image acquirer 40 acquires a frame image in a real space captured by the imaging apparatus 2. The imaging apparatus 2 acquires frame images at regular intervals and, more preferably, generates frame images at intervals of ⅟60 seconds. The game mat 300 and the game card 4 placed on the game mat 300 are located within the imaging area 5. Therefore, the frame image includes images of the game mat 300 and the game card 4.

The real object extractor 42 extracts real object images from the frame image. Since the purpose here is to adjust the range of pixel values in the RGB format for binarization of the corner cells 104, real object images to be extracted are gradation areas 310 on the game mat 300. It will be assumed that the corner cells 104 are colored green with predefined brightness, and the gradation areas 310 are formed as green gradation including the predefined brightness.

The binarization processor 50 sets up a range of RGB values for binarization so as to translate the frame image into a binary bit representation. More specifically, in order to extract the gradation areas 310a, 310b and 310c with green gradation, the binarization processor 50 sets up a range 120-255 of G pixel values, a range 0-20 of R pixel values and a range 0-20 of B pixel values so as to extract pixels in the RGB composite format within these ranges. The ranges of R and B pixel values are not set to 0-0 in consideration of, for example, the property of a color filter. The binarization processor 50 extracts pixels in the composite format within the ranges of pixel values in the RGB format thus established and codes the extracted pixel values as binary "1s".

The area extractor 60 retrieves the gradation areas 310 on the game mat 300 by referring to the binary data for the frame image. The gradation of the gradation areas 310 is such that the G pixel value is smaller at the center and the G pixel value is larger at the periphery. As a result of binarization, the gradation area 310 is translated into a binary bit representation such that pixel values in the composite format at the center are coded as binary "0s" and pixel values in the composite format at the periphery are coded as binary "1s", producing a doughnut shape where the central area is blank. The area extractor 60 then detects a doughnut shape in the binary data. Since there is little likelihood that features other than the gradation areas 310 are translated into a doughnut shape, forming the gradation areas 310 to be circular in shape offers significant benefits in terms of narrowing down the candidates of the gradation areas 310.

The four gradation areas 310 are provided at the vertices of a square. If multiple doughnut areas are detected as a result of green-based binarization and black-based binarization, those doughnut areas that occur at the vertices of the square are extracted and identified as the gradation areas 310. The doughnut areas identified as the green gradation areas 310a, 310b and 310c are communicated to RGB adjuster 62 for calibration of threshold values for binarization.

Figure 16A:
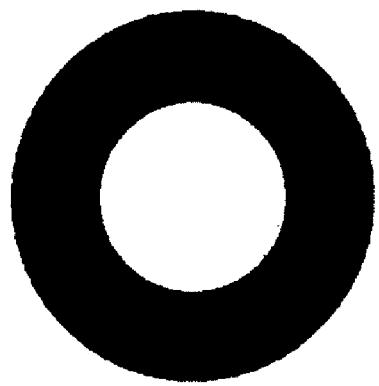
FIGS. 16A-16C show doughnut areas identified as gradation areas.
Figure 16B:
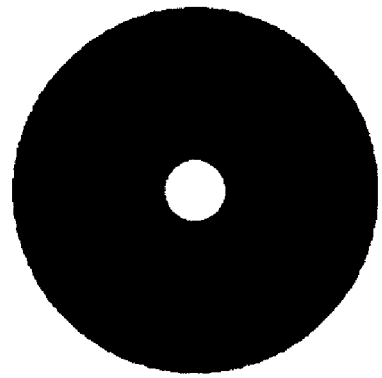
Figure 16C:
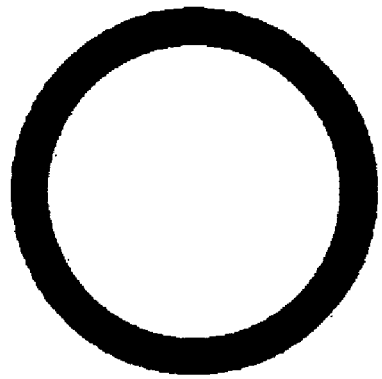

FIGS. 16A-16C show doughnut areas identified as gradation areas. A description will now be given of calibration of the range of G pixel values used for binarization and for detection of the corner cells 104 of the same color, by referring to the green gradation areas 310a-310c. It will be assumed that the threshold of G pixel values is 120 and the range of extraction is 120-255. The RGB adjuster 62 adjusts the range of pixel values in the RGB format used for binarization in the binarization processor 50, on the basis of binary data for the gradation area 310.

FIG. 16A shows a doughnut area having a ratio of 1:2 (more precisely, 121:256) between the inner diameter and the outer diameter. In this case, ambient light does not exercise any influence in the frame image captured by the imaging apparatus 2. The gradation area 310 is binarized in an ideal manner. In this doughnut area, the area 316 with the same brightness as that of the corner cells 104 is located at a point which divides the center and the outer edge by a ratio of 1:1 and is included in the black area in the doughnut area. Accordingly, by setting the threshold value of G pixel values at 120, the corner cells 104 can be extracted properly.

FIG. 16B shows a state in which the inner diameter of a doughnut area is too small in comparison with the outer diameter thereof. In this case, the area 316 located at a point which divides between the center and the outer edge by a ratio of 1:1 is included in the black area in the doughnut area, but an inside area with low gray levels is also extracted. For example, in the presence of ambient light which contains green components, the green light and the green color of the gradation area 310 may be superimposed on each other, causing the G component of the detected light to be intensified. In this case, the pixel values of the doughnut area as detected are higher than the theoretical values of the pixel values in the gradation area 310, causing the area coded as binary "1s" to be increased in scale more than necessary.

This means that, if the binarization processor 50 binarizes an image of the game card 4 by setting up a range 120-255 of the G pixel values in this case, extraction of the corner cells 104 will be successful, but it also results in extracting areas with a lighter green tone than the corner cells 104. Since an increase of the number of candidates for the corner cells 104 will require extended time to identify the corner cells 104, it is preferable that the range of pixel values for binarization be set so that the number of candidates for the corner cells 104 is reduced.

The RGB adjuster 62 holds the distribution of shades represented by the gradation of the gradation area 310 and the position of the area in which the same shade as that of the corner cells 104 occurs. Therefore, upon receipt of the doughnut shape shown in FIG. 16B, the RGB adjuster 62 determines that the threshold set up (120) is too low and determines that the threshold should be set at a higher value.

For example, the RGB adjuster 62 refers to the distribution of shades in the gradation area 310 and determines a theoretical value of the G pixel value at that point (inner diameter) in the gradation area 310, by referring to the distance between the center of the doughnut area and the internal circle (i.e., the radius of the white area). The G pixel value at that point is lower than 120 theoretically. In the doughnut area shown in FIG. 16B, however, the G pixel value as detected at that point is 120. Therefore, the RGB adjuster 62 may increase the threshold by an amount defined by a difference between the theoretical G pixel value in the gradation area 310 and the preset threshold of 120, the increase being necessitated by the ambient light. For example, given that the theoretical G pixel value in the gradation area 310 occurring at the boundary between the white area and the black area in the doughnut area is 60, a difference of 60 is created with respect to the preset threshold value of 120. The RGB adjuster 62 then sets up a G pixel threshold value of 180 for binarization and communicates the value to the binarization unit 50.

FIG. 16C shows a state in which the inner diameter of a doughnut area is larger than half of the outer diameter thereof. In this case, the area 316 located at a point which divides between the center and the outer edge by a ratio of 1:1 is included in the white area in the doughnut area. This means that the area 316 with the same brightness as that of the corner cells 104 is coded as "0s" as a result of binarization. For example, in the presence of considerably dark ambient light, pixel values lower than the theoretical values of the gradation area 310 may be detected.

This means that, if the binarization processor 50 binarizes an image of the game card 4 by setting up a range 120-255 of the G pixel values in this case, extraction of the corner cells 104 will not be successful. Therefore, there is a need to re-establish the range of G pixel values for binarization in a manner that a more extensive range of G pixel values are extracted so that area 316 with the same brightness as that of the corner cells 104 is properly extracted.

Upon receipt of the shape of the doughnut area shown in FIG. 16C, the RGB adjuster 62 determines that the threshold (120) set up is too high and determines that the threshold should be set at a lower value. For example, the RGB adjuster 62 refers to the distribution of shades in the gradation area 310 and determines a theoretical value of the G pixel value at that point (inner diameter) in the gradation area 310 by referring to the distance between the center of the doughnut area and the inner diameter (i.e., the radius of the white area). The G pixel value at that point is higher than 120 theoretically. In the doughnut area shown FIG. 16C, however, the G pixel value as detected at that point is 120. Therefore, the RGB adjuster 62 may lower the threshold by an amount defined by a difference between the theoretical G pixel value in the gradation area 310 and the preset threshold of 120. For example, given that the theoretical G pixel value in the gradation area 310 occurring at the boundary between the white area and the black area in the doughnut area is 180, a difference of 60 is created with respect to the preset threshold value of 120. The RGB adjuster 62 then sets up a G pixel threshold value of 60 for binarization and communicates the value to the binarization unit 50.

Upon receipt of the range of pixel values adjusted by the RGB adjuster 62, the binarization processor 50 binarizes the frame image by using the adjusted range. The area extractor 60 detects a doughnut area corresponding to the gradation area 310 in the binary data and communicates the detected area to the RGB adjuster 62. RGB adjuster 62 adjusts the threshold values for binarization by referring to the doughnut area and feeds back the adjusted values to the binarization processor 50. The above-mentioned calibration may continue to be performed until the doughnut shape as shown in FIG. 16A results.

Calibration described above is based on the range of G pixel values (threshold) for binarization. Calibration based on R pixel values or B pixel values may also proceed similarly. While the threshold value for R and B pixel values for binarization of the green gradation areas 310a, 310b and 310c is set at 20 by default, the RGB adjuster 62 may preferably adjust the default value as required.

The gradation areas 310a, 310b and 310c occur at three different locations in a space and, so, the optimal range of pixel values for binarization may differ depending on the location due to influence from ambient light or the like. If the direction of exterior lighting is such that the gradation areas 310a and 310b are brightly illuminated while the gradation area 310c is dark, the threshold value for binarization may be lowered in adaptation to the gradation areas 310c. This will result in successful detection of the corner cells 104 irrespective of the position of the game card 4 placed.

By lowering the threshold value for binarization, however, the likelihood of areas other than the corner cells 104 being extracted is increased in the neighborhood of the gradation areas 310a and 310b. In this respect, the optimal threshold values for binarization may be determined for the respective locations of the gradation areas 310 so that the threshold for binarization at an arbitrary position in the play area 306 may be derived from the threshold values for binarization at these three locations. For example, denoting the threshold value for binarization in the gradation area 310b by T1 and the threshold value in the gradation area 310c by T2, the threshold value for binarization may be linearly varied from T1 to T2 on a line connecting the gradation areas 310b and 310c. The threshold value for binarization may similarly be established for other arbitrary positions. The threshold value for binarization at a given point may be derived from its distance from the three locations mentioned above. The above approach ensures successful recognition of a code even when the conditions of illumination vary and so the code colors imaged vary considerably, depending on the card position (e.g., when the card is illuminated from close proximity).

The calibration according to this example may preferably be carried out at regular intervals. In a time-invariant environment, calibration need not be carried out frequently. A sensor for detecting variation in the environment may be provided so that calibration is carried out when the sensor detects a variation. For example, user-initiated movement of the game mat 300, change in the brightness of exterior lighting or the like may represent variation in the environment.

Calibration may proceed such that the threshold value for binarization may be corrected by referring to a difference between the actual pixel value occurring at a predetermined position in the gradation area 310 and the measured value obtained by imaging. Alternatively, the threshold value for binarization may be corrected so that the doughnut area obtained when binarizing the gradation area 310 has a specific shape. In the latter case, the threshold value for binarization may be incremented or decremented depending on the size of the doughnut area so that the shape of the doughnut area approaches a theoretical ideal. Instead of using a single threshold value for binarization, an upper threshold and a lower threshold may be provided so that binarization may be carried out by determining whether a pixel value falls within the range in between. For example, the pixel value may be coded as "0", when it is no less than 85 and no more than 170, and as "1" otherwise. In this case, the outer diameter of the gradation area 310 may first be determined by binarizing the gradation area 310 depending on whether the pixel value is higher than a threshold value for binarization. Measurements may then be taken of the doughnut area in the middle identified by the upper and lower threshold values which may be corrected so that the doughnut shape approaches a theoretical ideal. Shades as exhibited on the gradation area 310 may be reversed. In this case, the shades may be reversed before performing a binarization process.

As shown in FIG. 1, the imaging apparatus 2 captures an image of the game mat 300 from above and at an angle. Thus, the gradation areas 310 may be recognized as elliptical even if they are formed as perfect circles. In this case, too, it is possible to know the position and orientation of the game mat 300 in advance, and so such information may be used to correct the doughnut shape obtained as a result of recognizing the gradation areas 310, using affine transformation and similarity transformation, before carrying out the calibration described above.

Since it is preferable that the game mat 300 be firmly secured before carrying out calibration, calibration may be started only after it is confirmed that the position of the game mat 300 remains unchanged subsequent to multiple processes for recognition of the gradation areas 310 or only after it is confirmed that the position remains unchanged subsequent to recognition processes successively carried out at a predetermined interval. If the geometrical information of the game mat 300 is obtained as described above, it is possible to recognize whether the game card 4 is placed on the game mat 300 (i.e., the game card 4 and the game mat 300 are parallel, and the distance between them is practically 0), or the game card 4 is being held by the user (i.e., the game card 4 and the game mat 300 are removed from each other or are not parallel), by calculating the distance between the game mat 300 and the card game 4.

Figure 17:
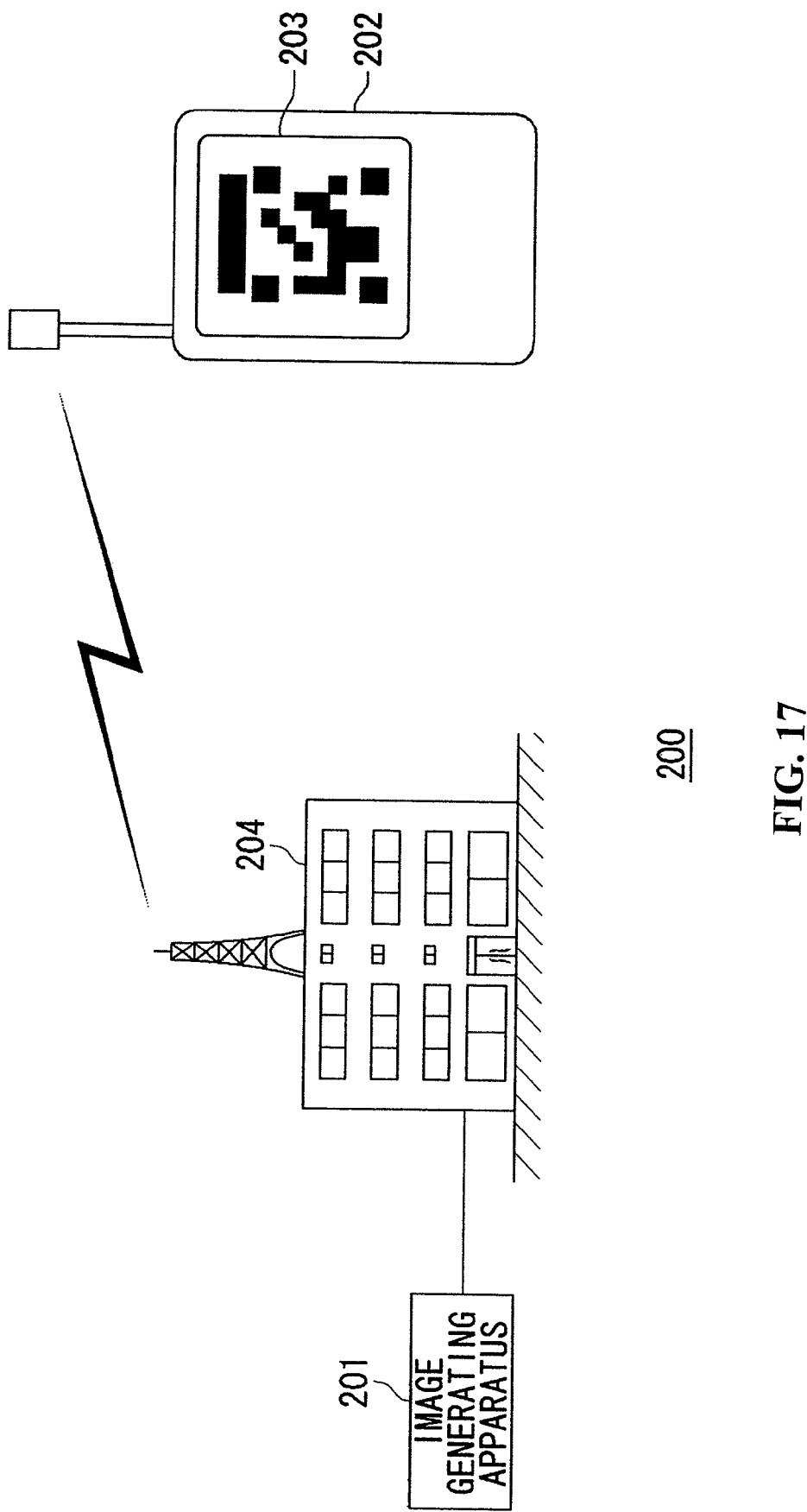
FIG. 17 shows a system of transmitting image data according to the example.

FIG. 17 shows a system for transmitting image data according to the example. The image data transmission system 200 includes an image data generator 201, a transmitting station 204 for transmitting image data and a terminal 202 for receiving the image data transmitted. The terminal 202 is provided with a display apparatus 203 for displaying the received image data. The image data transmission system 200 transmits data wirelessly. Alternatively, data may be transmitted by wire.

The image data generator 201 generates image data for the two-dimensional code described above (i.e., the image data for the two-dimensional code described with reference to FIGS. 2, 8, 9, 10 and 12) in accordance with a data format for display on the display apparatus 203 of the terminal 202. The image data for the two-dimensional code shown in FIG. 2 generated by the image data generator 201 may comprise data for displaying the multiple rectangular cells at predetermined coordinate positions on the display apparatus 203 and data for displaying the multiple corner cells at coordinate positions that surround the multiple rectangular cells. The image data generator 201 configures the data for the corner cells and the rectangular cells so that the corner cells as displayed on the display apparatus 203 appear larger than the rectangular cells.

The image data for the two-dimensional code shown in FIG. 8 generated by the image data generator 201 may comprise data for displaying the multiple rectangular cells at predetermined coordinate positions on the display apparatus 203 and data for displaying the multiple corner cells at coordinate positions that surround the multiple rectangular cells. The image data generator 201 configures the data for the corner cells so that the corner cells appear circular when displayed.

The image data for the two-dimensional code shown in FIG. 9 generated by the image data generator 201 may comprise data for displaying he reference cell having a predetermined shape at a predetermined position on the display, data for displaying the multiple polygonal cells within a predetermined area defined with respect to the reference cell, and data for displaying the multiple corner cells at coordinate positions that surround the area. The image data generator configures the data such that at least one of the reference cell, the polygonal cells and the corner cells is assigned a color different from that of the other cells. The image data for the two-dimensional code shown in FIGS. 10 and 12 generated by the image data generator 201 may comprise data for displaying he reference cell having a predetermined shape at a predetermined position on the display, data for displaying the multiple corner cells having the same shape, and data for displaying the corner cells within predetermined areas. The image data generator 201 configures the data such that the corner cells are assigned a color different from that of the reference cell and the polygonal cells.

The transmitting station 204 transmits the image data generated by the image data generator to the terminal 202. It is preferable that the image data be compressed in a format decompressable by the terminal 202. The image data should also be prepared in a data format displayable by the browser function in the terminal 202. The transmitting station 204 can reduce the volume of data transmitted by transmitting image data for each cell in association with the coordinate position thereof when displayed. The terminal 202 displays the two-dimensional code on the display apparatus 203. In the game system 1 of FIG. 1, the user may use the two-dimensional code displayed on the display apparatus 203 instead of the game card 4 so as to allow the code to be imaged by the imaging apparatus 2. With this, the user not in possession of the game card 4 can participate in the game system 1 by downloading the image data to the terminal 202.

Described above is an explanation based on the illustrative example. The example of the invention is only illustrative in nature and it will be obvious to those skilled in the art that variations in constituting elements and processes are possible and that those variations are within the scope of the present invention.

INDUSTRIAL USABILITY

The present invention is applicable to an article such as a card provided with a two-dimensional code or an apparatus for recognizing the two-dimensional code.

What is claimed is:

1. A card comprising:
a reference cell having a predetermined shape;
a plurality of polygonal cells forming code data; and
a plurality of corner cells having an identical shape, wherein
each of the plurality of corner cells occupies a larger area than any of the polygonal cells, and
all of the polygonal cells are provided outside an area surrounded by the plurality of corner cells.

2. The card according to claim 1, wherein the corner cells are assigned a color different from that of the reference cell and the polygonal cells.

3. The card according to claim 1, wherein the corner cells are triangular.

4. The card according to claim 1, wherein the corner cells are aligned to the respective edges of the card and are assigned a color other than black.

5. A rectangular card comprising:
a reference cell having a predetermined shape;
a plurality of polygonal cells forming code data; and
a plurality of corner cells having an identical shape, wherein
each of the plurality of corner cells occupies a larger area than any of the polygonal cells,
all of the polygonal cells are provided outside an area surrounded by the plurality of corner cells,
the plurality of corner cells are provided at a first edge and a second edge of the card opposite to each other, and
at least some of the plurality of polygonal cells are provided in the neighborhood of a third edge different from the first edge and the second edge and are arranged parallel with the third edge.

6. The card according to claim 5, wherein some of the plurality of polygonal cells are provided in the neighborhood of a fourth edge opposite to the third edge and are arranged parallel with the fourth edge, and wherein the plurality of polygonal cells provided parallel with the third edge and the fourth edge form a single two-dimensional code.

7. The card according to claim 5, wherein the polygonal cells and the reference cell are not formed in an area surrounded by the plurality of corner cells.

8. The card according to claim 6, wherein the polygonal cells and the reference cell are provided outside an area surrounded by the plurality of corner cells.

9. A rectangular card comprising:
a reference cell having a predetermined shape;
a plurality of polygonal cells forming code data; and
four corner cells, wherein
each of the four corner cells occupies a larger area than any of the polygonal cells,
all of the polygonal cells are provided outside an area surrounded by the plurality of corner cells,
two of the corner cells are provided in the neighborhood of a first edge, and the other two corner cells are provided in the neighborhood of a second edge opposite to the first edge, and
some of the plurality of polygonal cells are provided in the neighborhood of a third edge different from the first edge and the second edge and are arranged parallel with the third edge, and the other polygonal cells are provided in the neighborhood of a fourth edge opposite to the third edge and are arranged parallel with the fourth edge.

10. The card according to claim 9, wherein
the reference cell is rectangular, and
the reference cell is provided in the neighborhood of the third edge such that the longer side lies in the direction of length of the third edge.

11. The card according to claim 10, wherein
some of the plurality of polygonal cells are provided between the third edge and the reference cell arranged such that the longer side lies in the direction of length of the third edge.

12. The card according to claim 9, wherein
the corner cells are triangular,
two of the corner cells are arranged such that one of the sides of the triangle is parallel with the first edge, and the other two corner cells are arranged such that one of the sides of the triangle is parallel with the second edge, and
the other polygonal cells are provided between the fourth edge and a line connecting the vertices of the triangles of the two corner cells respectively provided in the first edge and the second edge so as to be opposite to each other.

13. The card according to claim 9, wherein
the corner cells are assigned a color different from that of the reference cell and the polygonal cells.

14. The card according to claim 9, wherein the number of the plurality of polygonal cells arranged in sequence is limited.

15. The card according to claim 9, wherein the plurality of polygonal cells are provided outside an area surrounded by the four corner cells.

16. A card comprising:
a rectangular reference cell;
a plurality of square cells forming code data; and
four corner cells assigned a color different from the color of the reference cell, wherein
the card is imaged by an imaging apparatus so that an image analysis apparatus acquires the code data from a frame image thus captured, the reference cell is detected from binary data produced by allowing a binarization processor of the image analysis apparatus to set up a range of pixel values in the RGB format and translate the frame image into a binary representation, the corner cells are detected from binary data produced by allowing the binarization processor to set up a range of pixel values in the RGB format different from the range set up for detection of the reference cell and translate the frame image into a binary representation, and the code data is acquired from the plurality of square cells by allowing the image analysis apparatus to read the layout of the plurality of square cells using the corner cells thus detected.

17. The card according to claim 16, wherein the corner cells are assigned a color different from the color of the square cells.

18. Image data generated in accordance with a data format for displaying a two-dimensional code on a display, comprising:

data for displaying a rectangular reference cell at a predetermined first coordinate position on the display;

data for displaying a plurality of square cells forming code data on a predetermined second coordinate position on the display; and data for displaying four corner cells, occupying a larger area than the square cells and assigned a color different from the color of the reference cell, at a predetermined third coordinate position on the display, wherein the reference cell, the square cells, and the corner cells displayed at predetermined positions on the display are imaged by an imaging apparatus so that an image analysis apparatus acquires the code data from a frame image thus captured, the reference cell is detected from binary data produced by allowing a binarization processor of the image analysis apparatus to set up a range of pixel values in the RGB format and translate the frame image into a binary representation, the corner cells are detected from binary data produced by allowing the binarization processor to set up a range of pixel values in the RGB format different from the range set up for detection of the reference cell and translate the frame image into a binary representation, and the code data is acquired from the plurality of square cells by allowing the image analysis apparatus to read the layout of the plurality of square cells using the corner cells thus detected.

19. A method for transmitting image data generated in accordance with a data format for displaying a two-dimensional code on a display, the image data transmitted comprising:

data for displaying a rectangular reference cell at a predetermined first coordinate position on the display;

data for displaying a plurality of square cells forming code data on a predetermined second coordinate position on the display; and data for displaying four corner cells, occupying a larger area than the square cells and assigned a color different from the color of the reference cell, at a predetermined third coordinate position on the display, wherein the reference cell, the square cells, and the corner cells displayed at predetermined positions on the display are imaged by an imaging apparatus so that an image analysis apparatus acquires the code data from a frame image thus captured, the reference cell is detected from binary data produced by allowing a binarization processor of the image analysis apparatus to set up a range of pixel values in the RGB format and translate the frame image into a binary representation, the corner cells are detected from binary data produced by allowing the binarization processor to set up a range of pixel values in the RGB format different from the range set up for detection of the reference cell and translate the frame image into a binary representation, and the code data is acquired from the plurality of square cells by allowing the image analysis apparatus to read the layout of the plurality of square cells using the corner cells thus detected.

* * * * *